United States Patent [19]

Zupancic et al.

[11] Patent Number: 5,534,565

[45] Date of Patent: *Jul. 9, 1996

[54] SOLVENT FREE EPOXY RESIN COMPOSITIONS CONTAINING SUBSTITUTED CYANOGUANIDINES

[75] Inventors: Joseph J. Zupancic, Bensenville; Jeffrey P. Conrad, Chicago, both of Ill.; Jiri D. Konicek, Onalaska, Wis.; Aroon V. Tungare, Arlington Heights, Ill.

[73] Assignee: AlliedSignal Inc., Morris Township, Morris County, N.J.

[*] Notice: The term of this patent shall not extend beyond the expiration date of Pat. No. 5,387,656.

[21] Appl. No.: 227,915

[22] Filed: Apr. 15, 1994

Related U.S. Application Data

[63] Continuation of Ser. No. 994,004, Dec. 21, 1992, abandoned.

[51] Int. Cl.$^6$ ..................................... C08L 63/02
[52] U.S. Cl. .................... 523/454; 528/89; 528/94; 528/98; 528/102; 528/111; 528/123
[58] Field of Search ................. 523/454; 528/89, 528/94, 98, 102, 111, 123

[56] References Cited

U.S. PATENT DOCUMENTS

| | | | |
|---|---|---|---|
| 2,455,807 | 12/1948 | Redmon et al. | 260/551 |
| 3,732,286 | 5/1973 | Son et al. | 528/123 |
| 4,327,143 | 4/1982 | Alvino et al. | 428/236 |
| 4,689,375 | 8/1987 | Lauterbach | 525/471 |
| 4,859,761 | 8/1989 | Flury et al. | 528/123 |
| 5,091,474 | 2/1992 | Murakami et al. | 528/124 |
| 5,387,656 | 2/1995 | Zupancic et al. | 525/523 |

FOREIGN PATENT DOCUMENTS

| | | |
|---|---|---|
| 0176484A3 | 9/1985 | European Pat. Off. . |
| 306451 | 8/1988 | European Pat. Off. . |
| 310545 | 8/1988 | European Pat. Off. . |
| 2348955 | 4/1977 | France . |
| 1223023 | 10/1986 | Japan . |
| 577843 | 5/1944 | United Kingdom . |
| WO86/00627 | 1/1986 | WIPO . |
| WO92/01726 | 2/1992 | WIPO . |

OTHER PUBLICATIONS

Translated copy of Japan Kokai 61-223023.
May (J. Org. Chem) 12, 437-442, 443-445 (1947).
Curd (J. Chem. Soc., 1630-1636) (1948)).
Curd (J. Chem. Soc. 729-737 (1946)).

*Primary Examiner*—Frederick Krass
*Attorney, Agent, or Firm*—Harold N. Wells; Roger H. Criss

[57] ABSTRACT

Epoxy resin compositions used in preparation of laminates for electronic applications are free of the solvents typically needed in current industrial practice. The use of certain mono-substituted dicyandiamides makes possible the elimination of such solvents since all of the components are soluble in epoxy resin to an extent which provides uniform properties in the cured laminates.

13 Claims, 5 Drawing Sheets

SOLVENT FREE EPOXY RESIN COMPOSITIONS CONTAINING SUBSTITUTED CYANOGUANIDINES

This application is a continuation of application Ser. No. 07/994,004 filed Dec. 21, 1992 now abandoned.

BACKGROUND OF THE INVENTION

This invention relates to epoxy resins used in fabrication of laminates such as are found in many electronic applications. More particularly, it relates to compositions which require little or none of the solvents generally required. Such solvents have been chosen particularly to dissolve curing agents such as dicyandiamide so that they can be uniformly distributed through the resin and thus can provide consistent laminate properties. However, the solvents used have been few in number and undesirable from an environmental standpoint. Consequently, improved curing agents are being developed which permit the use of less objectionable solvents. However, it would be more advantageous if no solvents were required or small amounts of less hazardous solvents were sufficient, thus eliminating or reducing worker exposure to solvents, reducing solvent emissions, and reducing or eliminating the generation of wastes. In addition, by utilizing low levels of environmentally conscious solvents or eliminating solvents, it is possible to generate higher quality prepregs and laminates due to the fact that residual high boiling point solvents will not be entrapped in the prepregs.

The basic requirements for curatives for epoxy based prepregs and laminates for printed circuit board applications and some cosmetic, structural, and non-structural applications are: 1) curatives which yield latent prepregs and compounded resins which do not significantly advance at 25° C. to 35° C. and 0% to 90% RH; 2) curatives which yield prepregs which show low or no advancement during storage at the above conditions, thus not requiring refrigeration during shipping and storage; 3) curatives which do not crystallize out of the epoxy resin varnish or prepreg, thus remaining homogeneous in properties and appearance; 4) curatives which do not result in the generation of volatile by-products which could result in voids being introduced during lamination; and 5) curatives which impart low viscosity and high gel times to the epoxy resin during prepregging and complete cure in a moderate time (15 min to 3 hours) at curing conditions ( 140° to 180° C.).

Dicyandiamide is well known as a curing agent for epoxy resin and as such possesses many desirable properties. It is also known to possess a serious deficiency in that it is soluble only in solvents which are undesirable, either because they are not suitable in most applications, such as water, or the solvents are relatively expensive and environmentally undesirable and high boiling, such as dimethylformamide, methylcellosolve, 1 -methoxy-2-propanol, N-methyl-2-pyrrolidinone, and the like. An object of this invention is to combine the benefits of reducing or eliminating the use of solvents while maintaining the characteristics of dicyandiamide cure of epoxy resins.

In U.S. Pat. No. 4,594,291 many epoxy resin compositions are described, some of which are said to require no solvents. While dicyandiamide is cited as a particularly suitable curing agent, no examples are given for its use. Bertram et al. claim it only as a curing agent for epoxy powder coatings since it is not suitable for liquid solvent free or environmentally conscious formulations because of its insolubility. Powder coating requires the use of specialized manufacturing equipment which is not applicable in the epoxy laminate industry.

Bertram et al. also teach the partial advancement of the epoxy resins in the presence of curing agents. They specifically teach that the compounded resin should be partially advanced to the extent that the melt viscosity has increased to a value which is at least about 20, preferably from about 25 to about 625, most preferably from about 50 to about 300, percent greater than the melt viscosity of the initial mixture components. The teachings in the patent demonstrate that the minimum temperature (mixing and degassing temperature) which is utilized is 100° C., in some cases it may be 120° to 130° C., and in other cases the advancement should be carried out at 140° to 150° C. It is specific that the resin once compounded must be partially advanced prior to utilization as solvent free coatings, powder coatings, or laminating varnish. We have found that the increases in viscosity called for by Bertram, et al. are deleterious to the performance of our invention in that impregnation of the substrate is impeded by high viscosity.

We have now found that the substituted dicyandiamides of U.S. patent application Ser. No. 07/912,045 may be used in formulating epoxy resin compositions in which solvents are not required while maintaining the characteristics of dicyandiamide cure. In addition, we have found that the substituted dicyandiamides permit the utilization of low levels of environmentally conscious solvents to yield homogeneous resin varnishes while maintaining the characteristics of dicyandiamide cure. In addition, we have found that formulations based upon substituted dicyandiamides show no crystallization of the curative from the B-Staged resin, thus resulting in homogeneous properties throughout the prepreg and the lamination process.

SUMMARY OF THE INVENTION

The epoxy resin compositions of the invention may be solvent-free and comprise curing agents, epoxy resins, and optional chain extenders, catalysts, and stabilizers as defined in more detail below. The curing agents are mono-substituted dicyandiamides (cyanoguanidines) having the formula:

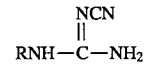

where

R is $-C_6H_4X$, $-CH_2C_6H_4X$, $-CH_2CH_2C_6H_4X$, or $-(CH_2)_nCH_3$ and

X is $-H$, $-CH_3$, $-OH$, $-OCH_3$, or $-N(CH_3)_2$ n is an integer from 5 to 11

Such mono-substituted dicyandiamides are soluble in various solvents such as acetone, methyl ethyl ketone, methyl isobutyl ketone, and cyclohexanone. However, no solvents are required in the formulations of the invention although they could be included if desired. In service as curing agents the substituted cyanoguanidines will be employed in amounts up to about 20 wt. % of the epoxy resin precursors, preferably to 10wt. %.

DESCRIPTION OF THE PREFERRED EMBODIMENTS

Substituted Dicyandiamides

Figure 1:
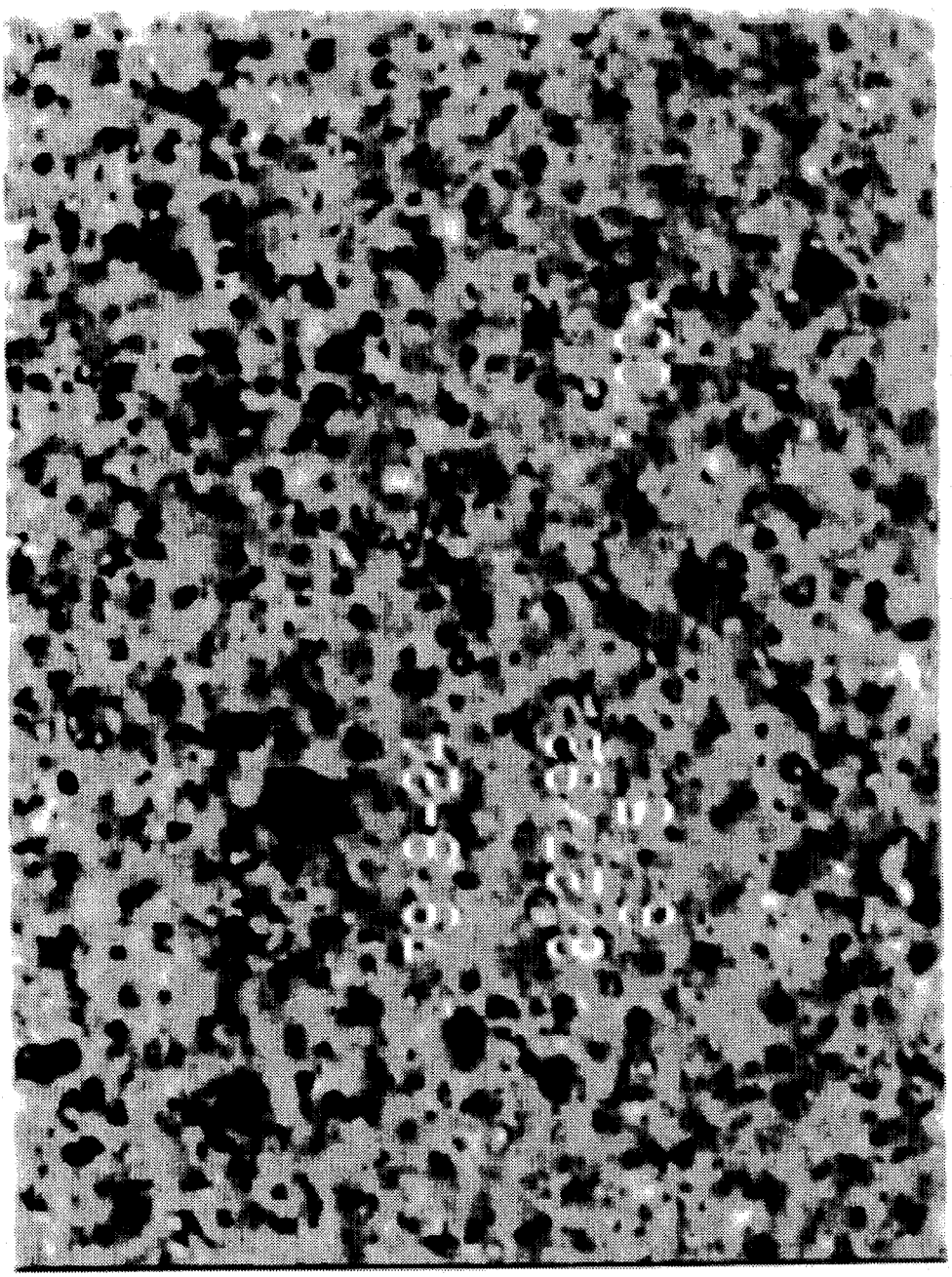
FIG. 1 is a photograph of a mixture of DICY with a diglycidyl ether-bisphenol A-epoxy resin.

Mere substitution of other groups for the hydrogen atoms in cyanoguanidine is not sufficient to provide the desired results. Many substituted cyanoguanidines do not have the improved solubility characteristics sought.

Mono-substituted dicyandiamides having the formula

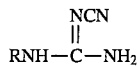

where

R is $-C_6H_4X$, $-CH_2C_6H_4X$, $-CH_2CH_2C_6H_4X$, or $-(CH_2)_nCH_3$ and

X is $-H$, $-CH_3$, $-OH$, $-OCH_3$, or $-N(CH_3)_2$ n is an integer from 5 to 11 have improved solubility over the parent compound and still retain a high curing ability so that they are effective in amounts of up to about 20 wt. percent, preferably 2 to 10 wt. percent, of the epoxy resin precursors.

The mono-substituted dicyandiamides and the di-substituted cyanoguanidines (dicyandiamides) such as are disclosed in published application EP 310,545 differ in the degree of reactive functionality. In order for the curing agent to react and generate a cross-linked epoxy based polymer network, the amine radicals react with the epoxide radicals. The degree of reactive functionality of the cyanoguanidine will depend on the degree of functionalization for the cyanoguanidine, which is related to the number of exchangeable nitrogen hydrogens of the cyanoguanidine. For example, dicyandiamide (cyanoguanidine) has a defined degree of functionality of four, that is, it is capable of addition to four epoxide radicals. In the case of a mono-substituted cyanoguanidine the degree of functionality is three and it is capable of reacting with three epoxide radicals. For a di-substituted cyanoguanidine as in EP 310, 545 the degree of functionality is two, and it is capable of reacting with two epoxide radicals.

The degree of reactive functionality for the curing agent will affect the type of polymer network formed in the cured polymer system and consequently will affect the performance properties in B-Stage or a prepreg, such as the viscosity as a function of cure, the solvent resistance for the polymer, the glass transition temperature (Tg) for the polymer, and the coefficient of thermal expansion ($\alpha_g$). For example, when a curing agent with a degree of reactive functionality of two (EP 310,545) is employed, the network will have a high degree of linear structures with only a minor degree of branching. When a curing agent with a degree of reactive functionality of three (the present invention) is employed, the polymer network will have a high degree of branched or star-like structures and a minimum of linear type structures. The branched or star-like structures will affect the resin flow properties (resin flow viscosity) for the B-Staged resin during lamination. If the resin flow viscosity is low then the laminates or composites formed will experience a high degree of resin flow, generating laminates or composites with voids or resin-poor products. Linear structures in the cured polymer will yield poor solvent resistance due to the solvation of the polymer fragments or swelling of the polymer. Branched or star-like structures provide improved solvent resistance due to the formation of a more highly cross-linked network. Linear structures will yield a polymer of lower Tg and may yield a higher coefficient of thermal expansion than a polymer with branched structures.

The curing agents may be prepared by various methods known to those skilled in the art.

The method disclosed by Redmon et al. in U.S. Pat. No. 2,455,807 is considered to be of particular value in preparing substituted cyanoguanidines. This method may be described generically by the following reaction according to Redmon et al.

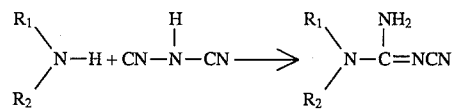

In practice, a metal salt of dicyanamide (CN—NH—CN) preferably is used, such as sodium dicyanamide. The use of an acid salt of the amine is then required to obtain neutral products. The selected substituted amine, for example, benzyl amine may be dissolved in a suitable solvent, such as butanol, ethanol, propanol and water and neutralized with an acid, for example, sulfuric or hydrochloric acid. Alternatively the amine can be mixed with hydrochloric acid to form a slurry. Sodium dicyanamide is added in an approximately stoichiometric quantity. The reaction is carried out at temperatures between about 75° C. and 110° C. and at pressures of atmospheric to 2068 kPa for a period of time necessary to complete the reaction. Preferably, a temperature of about 100° to 110° C. will be used with the reaction time being about 2 to 24 hours. Thereafter, if used, the solvent is distilled off and the substituted cyanoguanidine is recovered by crystallization and washing.

Epoxy Resins

The substituted dicyandiamides may be utilized with various epoxy resins known in the art. In general, these will include diglycidyl ether bisphenol-A (DGEBA), diglycidyl ether tetrabromobisphenol-A, triglycidyl ether triphenol methane, triglycidyl ether triphenol ethane, tri2,3-epoxy propyl isocyanurate, tetraglycidyl ether tetraphenol ethane, tetraglycidyl ether methylene dianiline, perglycidyl ether novolac resin and oligomers and mixtures thereof. More particularly, diglycidyl ether bisphenol-A (DGEBA) type of resins have been found to be the major epoxy component employed in these formulations, however, for systems of increased Tg ($\geq 150°$ C.) the use of multifunctional epoxies (i.e. triglycidyl ether triphenol methane, triglycidyl ether triphenol ethane, tetraglycidyl ether tetraphenol ethane, tetraglycidyl ether methylene dianiline, perglycidyl ether novolac resin and oligomers) can be employed in increasing concentrations or as the primary or sole epoxy components.

Chain Extenders

Chain extenders are components which can be added to advance the epoxy resin. The chain extender reacts with the epoxide functionality of the epoxy resin. The chain extender typically will have a minimum functionality of two and a maximum average functionality of seven. Thus, the chain extender will react with two or more epoxy moieties and act as a linking group between the epoxy molecules.

Chain extenders of particular interest will yield stable functional groups which under normal processing and use conditions will not revert to the precursor systems. Chain extenders include biphenols, bisphenols, trisphenols, tetraphenols, multi-functional phenols, dicarboxylic acids, tricarboxylic acids, tetracarboxylic acids, and phenol carboxylic acids. In addition, it may be useful for the chain extender to contain halogen radicals in order to impart flame retardant properties into the epoxy resin, prepreg and laminate.

Chain extenders of particular interest are: resorcinol, bisphenol-A, tetrabromo bisphenol-A, tetrachloro bisphenol-A, biphenol, tetrabromo biphenol, tetramethyl biphenol, hexamethyl biphenol, triphenol methane, triphenol ethane, hexabromo triphenol ethane, tetraphenol ethane, perbromo tetraphenol ethane, novolac resin, isophthalic acid, terephthalic acid, trimesic acid, pyromellitic acid, salicylic acid, and hydroxycinnamic acid and mixtures of these compounds.

Catalysts

In order to facilitate the reaction of the substituted dicyandiamide and/or chain extender with the epoxy resin, it may prove useful to employ a catalyst. There are various catalysts known in the art which can be employed in this invention. These may be classified as nitrogen-based or phosphorous-based. They may be used in combination to facilitate different advancement and reactions of the epoxy resins. The catalysts which are preferred offer distinct advantages over others and will be free of transition metals.

For example, the nitrogen-based catalysts may include imidazole, 2-methylimidazole, 4-methylimidazole, 2-phenylimidazole, 4-phenylimidazole, 2-ethylimidazole, 1-cyanoethyl-2-phenylimidazole, 1-(2-cyanoethyl)- 2-ethyl-4-methylimidazole, 2-ethyl-4-methylimidazole, 1 -isopropyl-2-methyl-imidazole, benzyldimethylamine, 4-(dimethylamino)-N,N-dimethylbenzylamine, 4-methyl-N,N-dimethylbenzylamine, and the like.

The phosphorous-based catalysts which can be employed to accelerate the reaction of epoxy resin with phenolic components or hydroxyl radicals for example may include triphenylphosphine, tritolylphosphine, tetrabutylphosphonium bromide, tetrabutylphosphonium iodide, methyltriphenylphosphonium bromide, methyltriphenylphosphonium iodide, methyltritolylphosphonium bromide, methyltritolylphosphonium iodide, ethyltriphenylphosphonium bromide, ethyltriphenylphosphonium iodide, ethyltritolylphosphonium bromide, ethyltritolylphosphonium iodide, tetrabutylphosphonium acetate, methyltriphenylphosphonium acetate, methyltritolylphosphonium acetate, ethyltriphenylphosphonium acetate, ethyltritolylphosphonium acetate, propyltriphenylphosphonium acetate, propyltritolylphosphonium acetate, tetrabutylphosphonium phosphate, methyltriphenylphosphonium phosphate, methyltritolylphosphonium phosphate, ethyltriphenylphosphonium phosphate, ethyltritolylphosphonium phosphate, propyltriphenylphosphonium phosphate, propyltritolylphosphonium phosphate, and the like.

Stabilizers

The use of a stabilizer in the system offers a number of advantages: increased gel times, a latent catalyst system which does not advance at ambient conditions (T=25°–35° C., RH=0%–90%), accelerated cure during lamination, and controlled resin flow. In addition, the stabilizer should be capable of reacting with the epoxy resin and yield a stable functionality which will not revert to precursors under normal operating conditions.

Stabilizers which may be useful in this invention are organic acids and inorganic acids, for example, isophthalic acid, terephthalic acid, salicylic acid, and hydroxycinnamic acid.

Preparation of Laminates

Reinforced laminates for the electronics industry may be prepared from composition of the invention without requiring the use of solvents. The methods used to prepare such laminates are well known to those skilled in the art and need not be discussed in detail here. In general, it may be stated that the fabric which is to be used to reinforce the laminate, typically made of glass fibers, is coated with epoxy resins combined with the crosslinking agents and a catalyst as desired. The coated fabric is then heated in order to cure (polymerize and crosslink) the epoxy resins and the crosslinking agents. Multiple layers of coated fabric are commonly combined to provide the laminates needed for electronic circuit boards. When only a partial cure is carried out, the resulting product is often referred to as a "prepreg" or "B-stage" material. Further curing is later carried out to complete the laminate. These processes are carried out in batch or continuous processes familiar to those skilled in the art.

EXAMPLE 1

Synthesis of N-Benzyl-dicyandiamide (BZDICY)

588.6 g (600 mL, 5.49 moles) of benzylamine and 4680 mL of 1-butanol are charged into a 12 Liter 3-neck round bottom flask equipped with a condenser, addition funnel, mechanical stirrer, thermometer and nitrogen purge. To this reaction mixture is added 164 mL (3.08 moles) of concentrated sulfuric acid in 1200 mL of 1-butanol dropwise over a 1.25 hour period, the reaction mixture reaches a temperature of 50° C. during this addition. To the above reaction mixture is added 602.5 g (6.15 moles) of sodium dicyanamide and 100 mL of water, the reaction mixture is heated with stirring to 100° C. and maintained at 100° C.±5° C. for 4 hours. To the cooled reaction mixture is added an excess of water (2 Liters) and the butanol is azeotropically distilled off. Upon cooling a precipitate separates and is filtered off and then washed with 2250 mL of 5% sodium hydroxide solution, filtered, washed with 2250 mL of 5% acetic acid solution, filtered and washed with 2250 mL of deionized water. The product is then recrystallized from boiling water, yielding 645.0 g (67.5% yield) of white crystalline solid, m.p. 109°–110° C.

EXAMPLE 2

Synthesis of N-Benzyl-dicyandiamide (BZDICY)

58.9 Liters (57.8 Kg, 539.0 moles) of benzyl amine is charged to a 150 gallon stainless steel Mueller reactor. The benzyl amine is cooled to 5°–10° C. To the stirred reaction mixture is added 44.2 Liters (52.3 Kg of 37.6% HCl, 539.0 moles) of concentrated hydrochloric acid to neutralize the amine. The rate is controlled by limiting the reaction temperature to 50° C. When the addition is complete, the reaction mixture is heated to 70° C. and 50.0 Kg (539.0 moles) of 96% sodium dicyanamide powder is added to the reactor. The reactor is closed and heated to 100° C. This temperature is maintained for 6.5 hours. While the heating is continued, 265 Liters of water are added to the reactor. The temperature is kept above 60° C. during this addition.

The reactor is then cooled to 20° C. and stirred one hour. The product is allowed to settle in the reactor and the aqueous phase is removed. 265 Liters of water are added and the reactor heated to 70° C. then allowed to cool to room temperature. The water is removed and the product washed twice with 55 gallons of 5% aqueous acetic acid and twice with 55 gallons of water. 71.0 Kg of the product (75.6% yield) is collected in filter bags as a white solid and dried under vacuum at 50°–70° C., yielding a white crystalline solid with a m.p. 112.8° C. (via DSC).

EXAMPLE 3

Synthesis of N-(4-Methylbenzyl)-dicyandiamide (MBZDICY)

200.00 g (1.650 moles) of 4-methylbenzylamine and ca. 1400 mL of butanol are charged into a 5 Liter 3-neck round bottom flask equipped with condenser, addition funnel and mechanical stirrer. To this stirred reaction mixture is added 90.65 g (50.0 mL, 0.924 moles) of concentrated sulfuric acid in 370 mL of butanol dropwise. To the above reaction mixture is added 164.57 g (1.850 moles) of sodium dicyanamide and 37 mL of water and the reaction mixture is heated with stirring to 100° C. and maintained at 100° C.±5° C. for 4.75 hrs., during the course of the reflux 85.00 mL of water is added to the reaction. To the cooled reaction mixture is added an excess of water (3 Liters) and the butanol is azeotropically distilled off. Upon cooling a precipitate separates and is filtered off and then washed with 1000 mL of 5% sodium hydroxide solution, filtered, washed with 1000 mL of 5% acetic acid solution, filtered and washed with 1000 mL of water. The product is then recrystallized from boiling water, yielding 168.3 g (54.1% yield) of white crystalline product, m.p. 137°–138° C.; Elemental Analysis, Found C 62.84%, H 6.26 % N 29.16%, Calculated C 63.79%, H 6.44%, N 29.77%.

EXAMPLE 4

Synthesis of N-(4-Methoxybenzyl)-dicyandiamide (MOBZDICY)

200.00 g (1.460 moles) of 4-methoxybenzylamine and ca. 1230 mL of butanol are charged into a 5 Liter 3-neck round bottom flask equipped with condenser, addition funnel and mechanical stirrer. To this stirred reaction mixture is added 80.08 g (43.5 mL, 0.816 moles) of concentrated sulfuric acid in 330 mL of butanol dropwise. To the above reaction mixture is added 145.38 g (1.630 moles) of sodium dicyanamide and 32 mL of water, the reaction mixture is heated with stirring to 100° C. and maintained at 100° C.±5° C. for 6.0 hrs. During the course of the reflux 76 mL of water is added to the reaction. To the cooled reaction mixture is added an excess of water (3 Liters) and the butanol is azeotropically distilled off. Upon cooling a precipitate separates and is filtered off and then washed with 1000 mL of 5% sodium hydroxide solution, filtered, washed with 1000 mL of 5% acetic acid solution, filtered and washed with 1000 mL of water. The product is then recrystallized from boiling water, yielding 103.8 g (34.8% yield) of white crystalline product, m.p. 91°–93° C.; Elemental Analysis, Found C 58.62%, H 6.06%, N 26.58%, Calculated C 58.80%, H 5.93%, N 27.44%.

EXAMPLE 5

Synthesis of N-Phenyl-dicyandiamide (PDICY)

200.00 g (1.540 moles) of aniline hydrochloride and 425 mL of water are charged into a 1 Liter 3-neck round bottom flask equipped with condenser and mechanical stirrer. To the above reaction mixture is added 140.0 g (1.570 moles) of sodium dicyanamide and the reaction mixture is heated with stirring to 90° C. and maintained at 90° C.±5° C. for 0.5 hrs. A large amount of solid precipitate forms and stirring becomes ineffective. 400 mL of water are added and the reaction is maintained at temperature for 1.0 Hr. The reaction mixture is cooled and filtered and the product is washed with 1000 mL of water. After drying 211.7 g (86.0% yield) of a grey solid product is isolated, m.p. 192°–193° C.; Elemental Analysis, Found C 60.04%, H 5.31%, N 35.74%, Calculated C 59.98%, H 5.04%, N 34.98%.

EXAMPLE 6

Synthesis of 1-Phenethyl-3-cyanoguanidine (PEDICY)

48.25 g (0.398 moles) of phenethyl amine is charged to a 500 mL three neck round bottom flask equipped with a stirring shaft and a dropping funnel. The flask is cooled in an ice bath as 38.59 g (0.398 moles) of concentrated hydrochloric acid is added dropwise. After the addition of the acid, the ice bath is replaced by a heating mantle and the mixture is heated to 50° C. 37.20 g (0.418 moles) of sodium dicyanamide is added to the flask with stirring. The mixture is heated to 100° C. and stirred for 6.5 hours then cooled in an ice bath. 150 mL of water are added and the white, crystalline precipitate is collected on a Buchner funnel. The product is recrystallized from water yielding 55.5 g of 1-phenethyl- 3-cyanoguanidine (74.1% of theoretical) melting point at 111°–112° C.

EXAMPLE 7

Synthesis of 4-(N,N-Dimethylamino)benzylamine 74.62 g (0.500 mols) of N,N-dimethylaminobenzaldehyde, 6.1815 g of Raney Nickel, and 200 mL of ethanol were charged into a glass liner for a 850 cc autoclave. The glass liner is placed within an autoclave and then 10.0 g of ammonia and 850 psi hydrogen at 25° C. are added. The reactor is then heated to 70° C. over a 1.5 Hour period and maintained at 70° C. for 5 hrs. The reaction mixture is then allowed to cool to ambient temperature. The reaction mixture is filtered through a fritted glass filter to remove the catalyst and the filtrate is concentrated under vacuum to yield a yellow liquid (crude yield 73.53 g, 97.9%).

Three comparable reaction runs were combined (crude yields of 73.53 g, 88.60 g, and 76.93 g) and vacuum distilled to yield a colorless liquid of 183.0 g (81.2%), b.p. 125° C./2.4 mm.

Synthesis of N'-(4-(N,N-Dimethylamino)benzyl)-dicyandiamide (DMABZDICY)

61.4 g (0.408 moles) of 4-(N,N-dimethylamino)benzylamine and ca. 31 0 mL of butanol are charged into a 2 liter 3-neck round bottom flask equipped with condenser, addition funnel and mechanical stirrer. To this stirred reaction mixture is added 22.43 g (12.2 ml, 0.229 moles) of concentrated sulfuric acid in 90 mL of butanol dropwise. To the above reaction mixture is added 40.72 g (0.457 moles) of sodium dicyanamide and 10 mL of water and the reaction mixture is heated with stirring to 100° C. and maintained at 100° C.±5° C. for 5.5 hrs. During the course of the reflux 20 mL of water is added to the reaction. To the cooled reaction mixture is added an excess of water (1 liter) and the butanol is azeotropically distilled off. Upon cooling a precipitate separates and is filtered off and then washed with 300 mL of 5% sodium hydroxide solution, filtered, washed with 300 mL of 5% acetic acid solution, filtered and washed with 500 mL of water. The crystalline solid is then recrystallized from ethanol:water (90:10), yielding 55.2 g (62.3% yield) of gray crystalline product, m.p. 137°–139° C.; Elemental Analysis, Found C 61.41%, H 7.29%, N 32.24%, Calculated C 60.79%, H 6.97%, N 32.24%.

EXAMPLE 8

Synthesis of N-Hexyl-dicyandiamide (HXDICY)

153.2 g (1.51 moles) of hexylamine is charged into a 5 liter 3-neck round bottom flask equipped with condenser, addition funnel, mechanical stirrer and cooled to 5° C. via an ice bath. To this stirred reaction mixture is added 145.65 g (124.0 ml, 1.51 moles) of concentrated hydrochloric acid dropwise. To the above reaction mixture is added 133.44 g (1.50 moles) of sodium dicyanamide and the reaction mixture is heated with stirring to 100° C. and maintained at 100° C.±5° C. for 5.0 hrs. 500.0 mL of water are added to the reaction and a waxy solid forms. After cooling the solid is acidified with concentrated hydrochloric acid. The crystalline product is filtered and washed with water twice. Filtration and drying yields 224.5 g (89.0% yield) of white crystalline product, m.p. 95°–98° C.; Elemental Analysis, Found C 55.92%, H 8.78%, N 33.15%, Calculated C 57.10%, H 9.60%, N 33.30%.

EXAMPLE 9

Synthesis of N-Dodecyl-dicyandiamide (DDDICY)

185.36 g (1.00 moles) of dodecylamine and ca. 400 mL of butanol are charged into a 5 liter 3-neck round bottom flask equipped with condenser, addition funnel and mechanical stirrer. To this stirred reaction mixture is added 49.04 g (26.60 ml, 0.500 moles) of concentrated sulfuric acid in 50 mL of water dropwise, final pH is 6 to 7. To the above reaction mixture is added 99.71 g (1.12 moles) of sodium dicyanamide and the mixture heated to 95°–100° C. A mild vacuum is applied and the water is removed via a Dean-Stark trap. 50 mL of additional water are added and removed as above. The mixture is maintained at reflux for an additional 70 minutes after the water removal is complete. 3 liters of water are then added and the butanol removed via an azeotropic distillation. A white, waxy solid separates on cooling and is collected on a Büchner funnel. The product is washed with 1 L of 51% sodium hydroxide and then dissolved in hot ethanol. The solution is neutralized with acetic acid, filtered and water added until the cloud point is reached. The solution is cooled and the product collected, m.p. 89°–90.5° C. 125 mL of water is added to the reaction dropwise over an 2.25 hour interval. The reaction is maintained at 95° C. during the addition of hydrochloric acid. A grey solid precipitates, which is filtered off and then washed in boiling methanol, yielding 253.9 g (78.0% yield) of a grey product, m.p. 198°–201° C.; Elemental Analysis, Found C 61.99%, H 5.93%, N 31.84%, Calculated C 62.04%, H 5.80%, N 32.16%.

EXAMPLE 10

Synthesis of N-(3-Methoxyphenyl)-dicyandiamide (MOPDICY)

181.62 g (2.04 moles) of sodium dicyanamide and 400 mL of water and 246.32 g (2.00 moles) of m-anisidine are charged into a 2 liter 3-neck round bottom flask equipped with condenser, addition funnel and mechanical stirrer. The reaction mixture is heated with stirring to 100° C. and 166.0 mL of concentrated hydrochloric acid diluted with 150 mL of water is added to the reaction dropwise over an 2.5 hour interval. The reaction is maintained at 100° C. during the addition of hydrochloric acid. After the addition is complete, the reaction is maintained at 95°–100° C. for 3.0 hrs. A precipitate separates which is filtered and washed with 1000 mL of water. The brown solid is then washed in methanol, yielding 295.6 g (77.7% yield) of a light pink product, m.p.186°–188° C.; Elemental Analysis, Found C 56.27%, H 5.33%, N 29.75%, Calculated C 56.82%, H 5.31%, N 29.46%.

EXAMPLE 11

Synthesis of N-(4-Methylphenyl)-dicyandiamide (p-MPDICY)

181.62 g (2.04 moles) of sodium dicyanamide, 400 mL of water and 214.32 g (2.00 moles) of p-toluidine are charged into a 5 liter 3-neck round bottom flask equipped with condenser, addition funnel and mechanical stirrer. The reaction mixture is heated with stirring to 90° C. and 192.4 g of concentrated hydrochloric acid diluted with 150 mL of water is added to the reaction dropwise over a 1 hour interval. The reaction is maintained at 100° C. during the addition of hydrochloric acid. After the addition is complete the reaction is maintained at 90° C.±5° C. for 3.0 hrs., during which a large amount of brown precipitate separates. After cooling the product is filtered off and then washed with 1000 mL of 5% sodium hydroxide solution, filtered, washed with 1000 mL of 5% acetic acid solution, filtered and washed with 1000 mL of water. The solid is then washed in boiling methanol, yielding 254.2 g (72.9% yield) of white crystalline product, m.p. 211°–213.5° C.; Elemental Analysis, Found C 62.00%, H 6.36%, N 30.81%, Calculated C 62.04%, H 5.80%, N 32.16%.

EXAMPLE 12

Synthesis of N-(3-Methylphenyl)-dicyandiamide (m-MPDICY)

168.90 g (1.90 moles) of sodium dicyanamide, 375 mL of water and 199.80 g (1.86 moles) of m-toluidine are charged into a 2 liter 3-neck round bottom flask equipped with condenser, addition funnel and mechanical stirrer. The reaction mixture is heated with stirring to 90° C. and 154.5 mL of concentrated hydrochloric acid diluted with 125 mL of water is added to the reaction dropwise over an 2.25 hour interval. The reaction is maintained at 95° C. during the addition of hydrochloric acid. A grey solid precipitates, which is filtered off and then washed in boiling methanol, yielding 253.9 g (78.0% yield) of a grey product, m.p. 198°–201° C.; Elemental Analysis, Found C 61.99%, H 5.93%, N 31.84%, Calculated C 62.04%, H 5.80%, N 32.16%.

EXAMPLE 13

Synthesis of N-(4-hydroxybenzyl)-dicyandiamide (HBZDICY)

36.45 g of 4-hydroxybenzylamine sulfate (0.106 mol) is slurried with 125 mL of butanol in a 500 mL 3-necked round bottom flask fitted with a Dean-Stark trap and a heating mantle. The mixture is neutralized with dilute aqueous sodium hydroxide. 91.9 g of sodium dicyanamide is then added with stirring and the temperature raised to 105° C. The temperature is maintained at 105° C. for 4.75 hours. No water is collected in the trap. 300 mL of water is then added and the butanol is distilled azeotropically. The mixture is cooled and 200 mL of water are added. A resinous product precipitates. The water is decanted and the product dissolved in methyl isobutyl ketone (MIBK) and washed twice with water. The organic phase is dried over sodium sulfate, filtered and rotary evaporated leaving 16 g (79% of theoretical) of a brown resin.

EXAMPLE 14

Synthesis of N-(3-hydroxyphenyl)-dicyandiamide (m-HPDICY)

90.6 g of sodium dicyanamide (1.02 mol) and 250 mL of water are added to a 500 mL 3-necked round bottom flask fitted with a reflux condenser, heating mantle and a mechanical stirrer. The mixture is heated to 80° C. at which point all of the dicyanamide salt dissolves. 100.0 g of m-aminophenol (0.916 mol) is added which also dissolves. 76.0 mL of concentrated hydrochloric acid (0.916 mol) is diluted with 80 mL of water and added dropwise over 45 minutes to the solution. A large amount of fine, white solid precipitates and heating is maintained an additional 2.25 hours. The mixture is then allowed to cool, the mixture is filtered and the precipitate is washed with water. The product is recrystallized from 1.5 l of water yielding an off-white powder which is dried in a vacuum oven. 1 38 g of product is recovered (85% yield) m.p. 194° C. Elemental analysis, found C 55.20%, H 4.76%, N 32.75%, calculated C 54.53%, H 4.59%, N 31.80%.

EXAMPLE 15

Solubility testing for all derivatives of dicyandiamide and the unsubstituted parent compound (DICY) were conducted by using a weight ratio of dicyandiamide to solvent of 1:10. For example, to 0.1 grams of the substituted dicyandiamide was added 1.0 gram of solvent. The sample was agitated slightly and dissolution recorded at 25° C.; complete dissolution receives a rating of +, partial dissolution is +δ, and no dissolution is rated as −. The sample is then heated to 50° C. for 30 minutes and the solubility recorded using the same rating system.

TABLE 1

Experimental Solubility for Substituted Benzyl-Dicyanodiamides

| | Substituted Benzyl-Dicyanodiamide | | | | | | | | | |
|---|---|---|---|---|---|---|---|---|---|---|
| | BZDICY | | MBZDICY | | MOBZDICY | | DMABZDICY | | HBZDICY | |
| | Temperature (°C.) | | | | | | | | | |
| Solvent | 25 | 50 | 25 | 50 | 25 | 50 | 25 | 50 | 25 | 50 |
| Acetone | + | + | − | + | + | + | − | + | +δ | +δ |
| Methylethylketone (MEK) | + | + | − | + | + | + | − | + | +δ | +δ |
| 1-Methoxy-2-Propanol | + | + | + | + | + | + | − | + | + | + |
| MEK/1-methoxy-2-propanol (50:50) | + | + | − | + | + | + | − | + | + | + |
| N,N-Dimethylformamide (DMF) | + | + | + | + | + | + | + | + | + | + |
| Dimethyl sulfoxide (DMSO) | + | + | + | + | + | + | + | + | + | + |
| N,N-Dimethylacetamide (DMAC) | + | + | + | + | + | + | − | − | + | + |
| N-Methyl-2-pyrrolidinone (NMP) | + | + | + | + | + | + | + | + | + | + |
| Ethylacetate | − | + | − | − | − | + | − | − | − | − |
| Methanol | + | + | − | + | + | + | − | − | + | + |
| Ethanol | + | + | − | + | + | + | − | − | + | + |
| Toluene | − | − | − | − | − | − | − | − | − | − |

TABLE 2

Experimental Solubility for Substituted Phenyl-Dicyanodiamides

| | Substituted Phenyl-Dicyanodiamide | | | | | | | | | |
|---|---|---|---|---|---|---|---|---|---|---|
| | PDICY | | m-MPDICY | | p-MPDICY | | m-MOPDICY | | m-HPDICY | |
| | Temperature (°C.) | | | | | | | | | |
| Solvent | 25 | 50 | 25 | 50 | 25 | 50 | 25 | 50 | 25 | 50 |
| Acetone | − | − | − | − | − | − | − | − | − | − |
| Methylethylketone (MEK) | − | − | − | − | − | − | − | − | − | − |
| 1-Methoxy-2-Propanol | − | − | − | − | − | − | − | − | − | + |
| MEK/1-methoxy-2-propanol (50:50) | − | − | − | − | − | − | − | − | − | − |
| N,N-Dimethylformamide (DMF) | + | + | + | + | + | + | + | + | + | + |
| Dimethyl sulfoxide (DMSO) | + | + | + | + | + | + | + | + | + | + |
| N,N-Dimethylacetamide (DMAC) | + | + | + | + | + | + | + | + | + | + |

TABLE 2-continued

Experimental Solubility for Substituted Phenyl-Dicyanodiamides

| | Substituted Phenyl-Dicyanodiamide | | | | | | | | | |
|---|---|---|---|---|---|---|---|---|---|---|
| | PDICY | | m-MPDICY | | p-MPDICY | | m-MOPDICY | | m-HPDICY | |
| | Temperature (°C.) | | | | | | | | | |
| Solvent | 25 | 50 | 25 | 50 | 25 | 50 | 25 | 50 | 25 | 50 |
| N-Methyl-2-pyrrolidinone (NMP) | + | + | − | + | + | + | + | + | − | + |
| Ethylacetate | − | − | − | − | − | − | − | − | − | − |
| Methanol | − | − | − | − | − | − | − | − | − | − |
| Ethanol | − | − | − | − | − | − | − | − | − | − |
| Toluene | − | − | − | − | − | − | − | − | − | − |

TABLE 3

Experimental Solubility for Substituted Alkyl-Dicyanodiamides

| | Substituted Alkyl-Dicyanodiamide | | | | | |
|---|---|---|---|---|---|---|
| | HXDICY | | DDDICY | | DICY | |
| | Temperature (°C.) | | | | | |
| Solvent | 25 | 50 | 25 | 50 | 25 | 50 |
| Acetone | − | − | − | + | − | − |
| Methylethylketone (MEK) | − | − | − | + | − | − |
| 1-Methoxy-2-Propanol | − | − | − | + | − | + |
| MEK/1-methoxy-2-propanol (50:50) | − | − | − | + | − | +δ |
| N,N-Dimethylformamide (DMF) | + | + | + | + | + | + |
| Dimethyl sulfoxide (DMSO) | + | + | + | + | + | + |
| N,N-Dimethylacetamide (DMAC) | + | + | + | + | +δ | + |
| N-Methyl-2-pyrrolidinone (NMP) | + | + | + | + | + | + |
| Ethylacetate | − | − | − | + | − | − |
| Methanol | − | − | − | + | +δ | + |
| Ethanol | − | − | − | + | − | − |
| Toluene | − | − | − | + | − | − |

TABLE 4

Experimental Solubility for Phenylethyl-Dicyanodiamides

| | PEDICY | |
|---|---|---|
| Solvent | 25° C. | 50° C. |
| Acetone | + | + |
| MEK | + | + |
| DMF | + | + |
| DMAc | + | + |
| NMP | + | + |
| EtAc | − | + |
| Methanol | + | + |
| Ethanol | + | + |
| Toluene | − | − |

EXAMPLE 16

Viscosity Studies of Epoxy with BZDICY 13,934 g of DER 331 epoxy resin (diglycidylether bisphenol-A, epoxy equivalent weight 182–192), 0,697 g of BZDICY were mixed using a high shear mixer until a homogeneous solution was obtained. The viscosity of the epoxy/BZDICY mixture was determined at various temperatures.

| T (°C.) | Viscosity |
|---|---|
| 32 | 5400 cps |
| 60 | 305 cps |
| 70 | 140 cps |

EXAMPLE 17

Viscosity Studies of Epoxy with and without BZDICY

Sample A: 10.678 g of DER 331 epoxy resin (diglycidylether bisphenol-A, epoxy equivalent weight 182–192), and 7.364 g of Quatrex 6410 (diglycidylether tetrabromobisphenol-A, epoxy equivalent weight 440–470, bromine content 47–51%) were mixed at 60° C. until a homogeneous solution was obtained.

Sample B: 10.678 g of DER 331 epoxy resin (diglycidylether bisphenol-A, epoxy equivalent weight 182–192), and 7.364 g of Quatrex 6410 (diglycidylether tetrabromobisphenol-A, epoxy equivalent weight 440–470, bromine content 47–51%) and 0.902 g of BZDICY were mixed at 60° C. until a homogeneous solution was obtained.

The viscosity of the epoxy with and without BZDICY was determined at 60° and 80° C.

| | Viscosity centipoise (cps) (mPa · s) | | |
|---|---|---|---|
| T (°C.) | Sample A | Sample B | Sample B Aged 18 Hrs. @ 65° C. |
| 60 | 2400 | 2965 | 4400 |
| 80 | 400 | 460 | 600 |

EXAMPLE 18

Curing Study of Epoxy with BZDICY 15.00 g of DER 331 epoxy resin (diglycidylether bisphenol-A, epoxy equivalent weight 182–192), and 10.38 g of Quatrex 6410 (diglycidylether tetrabromobisphenol-A, epoxy equivalent weight 440–470, bromine content 47–51%), 3.47 g of BZDICY, and 0.116 g of 1-isopropyl-2-methyl imidazole salicylate were mixed at 60° until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 60 | 125.4 |
| 180 | 128.3 |
| 360 | 130.1 |

Example 19

Curing Study of Epoxy with BZDICY 15.00 g of DER 331 epoxy resin (diglycidylether bisphenol-A, epoxy equivalent weight 182–192), and 10.42 g of Quatrex 6410 (diglycidylether tetrabromobisphenol-A, epoxy equivalent weight 440–470, bromine content 47–51%), 2.36 g of BZDICY, and 0.111 g of 1-isopropyl-2-methyl imidazole salicylate were mixed at 60° C. until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 60 | 137.0 |
| 180 | 134.3 |
| 360 | 137.0 |

Example 20

Curing Study of Epoxy with BZDICY 15.00 g of DER 331 epoxy resin (diglycidylether bisphenol-A, epoxy equivalent weight 182–192), and 10.26 g of Quatrex 6410 (diglycidylether tetrabromobisphenol-A, epoxy equivalent weight 440–470, bromine content 47–51%), 1.06 g of BZDICY, and 0.105 g of 1-isopropyl-2-methyl imidazole salicylate were mixed at 60° C. until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 60 | 69.6 |
| 180 | 93.1 |
| 360 | 108.0 |

EXAMPLE 21

Curing Study Of Epoxy with BZDICY 9.05 g of DER 331 epoxy resin (diglycidylether hisphenol-A, epoxy equivalent weight 182–192), and 5.46 g tetrabromobisphenol-A (TBBPA), were mixed and heated to 125° C. until a homogeneous solution was obtained. The resin mixture was cooled to 80° C. and then 0.495 g of BZDICY were added, followed by the addition of 0.06 g of 1-isopropyl-2-methyl imidazole salicylate. The resin mixture was stirred thoroughly until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 60 | 118.0 |
| 90 | 119.0 |
| 120 | 118.0 |
| 180 | 122.4 |
| 360 | 123.1 |

EXAMPLE 22

Curing Study of Epoxy with BZDICY 9.20 g of DER 331 epoxy resin (diglycidylether bisphenol-A, epoxy equivalent weight 182–192), and 5.10 g tetrabromobisphenol-A (TBBPA), were mixed and heated to 150° C. until a homogeneous solution was obtained. The resin mixture was cooled to 125° C. and then 0.70 g of BZDICY were followed by the addition of 0.06 g of 1-isopropyl-2-methyl imidazole salicylate, The resin mixture was stirred thoroughly until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 0 (B-Stage) | 44 |
| 60 | 116 |
| 120 | 120 |
| 180 | 121 |
| 360 | 122 |

EXAMPLE 23

Curing Study of Epoxy with BZDICY 9.20 g of DER 331 epoxy resin (diglycidylether bisphenol-A, epoxy equivalent weight 182–192), and 5.10 g tetrabromobisphenol-A (TBBPA), were mixed together and then heated to 200° C. to effect complete dissolution. The resin mixture was cooled to 125° C. and then 0.70 g of BZDICY were added. The resin mixture was cooled to 85° C. and then 0.06 g of 1-isopropyl-2-methyl imidazole salicylate were added and the resin mixture was stirred thoroughly until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 0 (B-Stage) | 44 |
| 60 | 115 |
| 120 | 119 |
| 180 | 122 |
| 360 | 125 |

EXAMPLE 24

Prepreg and Laminate Study of Epoxy with BZDICY 64.0 g of DER 331 epoxy resin (diglycidylether bisphenol-A, epoxy equivalent weight 182–192), and 34.0 g tetrabromobisphenol-A (TBBPA), were mixed together and then heated to 170° C. for 30 minutes to effect complete dissolution. The resin mixture was cooled to 120° C. and then 4.0 g of BZDICY and 0.40 g of 1-isopropyl-2-methyl imidazole salicylate were added and the resin mixture was stirred thoroughly until a homogeneous solution was obtained.

The resin mixture was coated onto 1080 glass fabric at 125° C. and then B-Staged at 125° C. for 15 minutes; the B-Staged resin had a Tg of 48.5° C. Four different prepregs were analyzed and found to have resin contents of 76.4%, 74.8%, 74.8% and 67.3%. A two ply laminate was prepared with copper foil in a hydraulic press using a cure cycle of 125° C. and 25 psi for 15 minutes and 170° C. and 100 psi for 1 hour. The Tg of the cured laminate was determined via DSC to be 117.5° C.

EXAMPLE 25

Curing Study Of Epoxy with BZDICY 8.61 g of DER 331 epoxy resin (diglycidylether bisphenol-A, epoxy equivalent weight 182–192), 5.08 g tetrabromobisphenol-A (TBBPA), and 0.75 g of tetraphenol ethane (TPE) (Mn=274, Mw=711) were mixed together and then heated to 200° C. to effect complete dissolution. The resin mixture was cooled to 125° C. and then 0.56 g of BZDICY were added. The resin mixture was cooled to 85° C. and then 0.06 g of 1-isopropyl- 2-methyl imidazole salicylate was added and the resin mixture was stirred thoroughly until a homogeneous solution was obtained.

The resin mixture was B-Staged at 125° C. and the B-Staged resin was cured in a hydraulic press at 170° C. and 50 psi for varying time periods. The Tg of the cured resin was determined via DSC.

| Time (mins.) | Tg (°C.) |
|---|---|
| 180 | 120 |
| 360 | 123 |

EXAMPLE 26

Curing Study of Epoxy with BZDICY 30.0 g of DER 331 epoxy resin (diglycidylether bisphenol-A, epoxy equivalent weight 182–192), 13.3 g tetrabromobisphenol-A (TBBPA), and 5.00 g of brominated tetraphenol ethane (BTPE) (Mn=1258) were mixed together and then heated to 170° C. for 15 minutes to effect complete dissolution. The resin mixture was cooled to 100° C. and then 1.70 g of BZDICY and 0.20 g of 1-isopropyl-2-methyl imidazole salicylate were added and the resin mixture was stirred thoroughly until a homogeneous solution was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 30 | 110.1 |
| 60 | 119.7 |
| 180 | 127.8 |
| 240 | 125.3 |

EXAMPLE 27

Curing Study of Epoxy with BZDICY 28.5 g of DER 331 epoxy resin (diglycidylether bisphenol-A, epoxy equivalent weight 182–192), 16.9 g tetrabromobisphenol-A (TBBPA), and 2.5 g of Epon 1031 epoxy resin (tetraphenolethane/epichlorohydrin epoxy resin, epoxy equivalent weight 220) were mixed and heated to 170° C. for 20 minutes to effect complete dissolution. The resin mixture was cooled to 100° C. and then 2.1 g of BZDICY and 0.20 g of 1-isopropyl- 2-methyl imidazole salicylate were added and the resin mixture was stirred thoroughly until a homogeneous solution was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 60 | 122.1 |
| 180 | 129.6 |
| 360 | 129.5 |

EXAMPLE 28

Curing Study of Epoxy with BZDICY 26.1 g of DER 331 epoxy resin (diglycidylether bisphenol-A, epoxy equivalent weight 182–192), 16.9 g tetrabromobisphenol-A (TBBPA), and 5.0 g of Epon 1031 epoxy resin (tetraphenolethane/epichlorohydrin epoxy resin, epoxy equivalent weight 220) were mixed and heated to 170° C. for 15 minutes to effect complete dissolution. The resin mixture was cooled to 100° C. and then 2.0 g of BZDICY and 0.20 g of 1-isopropyl- 2-methyl imidazole salicylate were added and the resin mixture was stirred thoroughly until a homogeneous solution was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 30 | 116.2 |
| 60 | 129.7 |
| 180 | 130.5 |
| 240 | 131.9 |

EXAMPLE 29

Curing Study of Epoxy with BZDICY 28.5 g of Epon 828 epoxy resin (diglycidylether hisphenol-A, epoxy equivalent weight 187), 16.9 g tetrabromobisphenol-A (TBBPA), and 2.5 g of Epon 1031 epoxy resin (tetraphenolethane/epichlorohydrin epoxy resin, epoxy equivalent weight 220) were mixed and heated to 170° C. for 15 minutes to effect complete dissolution. The resin mixture was cooled to 100° C. and then 2.1 g of BZDICY and 0.20 g of 1-isopropyl- 2-methyl imidazole salicylate were added and the resin mixture was stirred thoroughly until a homogeneous resin mixture was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 0 (B-Stage) | 61.1 |
| 30 | 117.6 |
| 60 | 127.3 |
| 180 | 126.7 |
| 360 | 129.6 |

EXAMPLE 30

Curing Study of Epoxy with BZDICY 26.1 g of Epon 828 epoxy resin (diglycidylether bisphenol-A, epoxy equivalent weight 187), 16.9 g tetrabromo-bisphenol-A (TBBPA), and 5.0 g of Epon 1031 epoxy resin (tetraphenolethane/epichlorohydrin epoxy resin, epoxy equivalent weight 220) were mixed and heated to 170° C. for 15 minutes to effect complete dissolution. The resin mixture was cooled to 100° C. and then 2.0 g of BZDICY and 0.20 g of 1-isopropyl- 2-methyl imidazole salicylate is added and the resin mixture was stirred thoroughly until a homogeneous solution was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 0 (B-Stage) | 61.4 |
| 30 | 119.2 |
| 60 | 132.4 |
| 180 | 135.4 |
| 360 | 129.3 |

EXAMPLE 31

Curing Study of Epoxy with BZDICY 30.15 g of Epon 828 epoxy resin (diglycidylether bisphenol-A, epoxy equivalent weight 187), 18.20 g tetrabromo-bisphenol-A (TBBPA), 1.65 g of BZDICY, and 0.20 g of 1-isopropyl-2-methyl imidazole salicylate were mixed thoroughly until a homogenous solution was obtained.

The resin mixture was B-Staged at 170° C. for 9 minutes and the B-Staged resin was cured in a hydraulic press at 170° C. and 50 psi for varying time periods. The Tg of the cured resin was determined via DSC.

| Time (mins.) | Tg (°C.) |
|---|---|
| 30 | 100 |
| 60 | 112 |
| 90 | 111 |
| 150 | 116 |
| 180 | 120 |
| 360 | 122 |

EXAMPLE 32

Curing Study of Epoxy with BZDICY 30.73 g of Epon 828 epoxy resin (diglycidylether bisphenol-A, epoxy equivalent weight 187), 16.90 g tetrabromo-bisphenol-A (TBBPA), 2.37 g of BZDICY, and 0.20 g of 1-isopropyl-2-methyl imidazole salicylate were mixed thoroughly until a homogenous solution was obtained.

The resin mixture was B-Staged at 170° C. for 9 minutes and the B-Staged resin was cured in a hydraulic press at 170° C. and 50 psi for varying time periods. The Tg of the cured resin was determined via DSC.

| Time (mins.) | Tg (°C.) |
|---|---|
| 30 | 105 |
| 60 | 115 |
| 90 | 120 |
| 120 | 122 |
| 150 | 121 |
| 180 | 125 |
| 360 | 120 |

EXAMPLE 33

Curing Study of Epoxy with MBZDICY

Stock Epoxy Resin: A stock solution of 770.0 g of DER 331 epoxy resin (diglycidylether hisphenol-A, epoxy equivalent weight 182–192), and 422.26 g tetrabromo-bisphenol-A (TBBPA) were mixed together employing a high shear mixture until a homogenous resin mixture was obtained.

50.0 g of the above stock epoxy resin was heated to 95° C. and then 2.0 g of MBZDICY and 0.20 g of 1-isopropyl-2-methyl imidazole salicylate were added and the resin mixture was stirred thoroughly until complete dissolution of all components was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 30 | 105 |
| 60 | 112 |
| 90 | 116 |
| 120 | 114 |
| 150 | 114 |
| 180 | 118 |
| 360 | 118 |

EXAMPLE 34

Curing Study of Epoxy with MOBZDICY 50.0 g of the stock epoxy resin of Example 24 was heated to 95° C. and then 2.0 g of MOBZDICY and 0.20 g of 1-isopropyl 2-methyl imidazole salicylate were added and the resin mixture was stirred thoroughly until complete dissolution of all components was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 30 | 111 |
| 60 | 114 |
| 90 | 114 |
| 120 | 115 |
| 150 | 116 |
| 180 | 118 |
| 360 | 118 |

EXAMPLE 35

Curing Study of Epoxy with PEDICY 50.0 g of the stock epoxy resin of Example 24 was heated to 95° C. and then 2.0 g of PEDICY and 0.20 g of 1-isopropyl-2-methyl imidazole salicylate were added and the resin mixture was stirred thoroughly until complete dissolution of all components was obtained.

The resin mixture was B-Staged at 170° C. and the B-Staged resin was cured in a hydraulic press at 170° C. and 50 psi for varying time periods. The Tg of the cured resin was determined via DSC.

| Time (mins.) | Tg (°C.) |
|---|---|
| 30 | 101 |
| 60 | 110 |
| 90 | 113 |
| 120 | 116 |
| 150 | 117 |
| 180 | 118 |
| 360 | 119 |

EXAMPLE 36

Epoxy curing with 1-Phenethyl-3-cyanoguanidine (PEDICY)

1.86 g of 1-phenethyl-3-cyanoguanidine (PEDICY) were dissolved in 25 mL of acetone. 0.11 g of 2-methylimidazole were the dissolved in the mixture.

This solution was added to 51.25 g of Dow epoxy XU 71881 resin (diglycidyl hisphenol A (DGEBA) and brominated DGEBA) and stirred until a homogeneous solution was obtained. This solution was B-Staged on a hot plate in a thin casting pan. The B-Staged resin was ground into a fine powder and cured at 170° C. in a hydraulic press at 1379 kPa for 15 minutes. Post cure was achieved in a 170° C. convection oven.

The polymer had the following properties as a function of cure:

| Time (min.) | Tg (°C.) |
|---|---|
| 60 | 104.9 |
| 180 | 123.2 |
| 360 | 126.6 |

EXAMPLE 37

Curing Study of Epoxy with BZDICY 1073.7 g of DER 331 epoxy resin (diglycidylether bisphenol-A, epoxy equivalent weight 182–192), and 550.8 g tetrabromobisphenol-A (TBBPA) were mixed together until homogeneous. 200.0 g of acetone and 75.5 g of BZDICY were added and mixed until homogenous. 3.40 g of 2-Methylimidazole (2MI)were then added and the resin mixture was stirred thoroughly until a homogeneous solution was obtained.

The gel time of the epoxy resin was determined at 130°, 150° and 170° C., this data is tabulated below.

| T (°C.) | Gel Time (sec.) |
|---|---|
| 130 | 251 |
| 150 | 202 |
| 170 | 142 |

The resin mixture was impregnated onto 7628 glass fabric at ambient temperature and passed through a drying region at 90° C. The prepreg was then B-Staged at 170° C. for 1, 2, 3, and 5 minutes, Samples A, B, C, and D respectively. Two ply laminates were prepared from the respective B-Staged prepregs and cured in a hydraulic press at 170° C. and 50 psi for varying time periods. The Tg of the cured laminates were determined via DSC and are tabulated below.

|  | Sample | | | |
|---|---|---|---|---|
| Time (mins.) | A Tg (°C.) | B Tg (°C.) | C Tg (°C.) | D Tg (°C.) |
| 30 | 115 | 118 | 120 | 118 |
| 60 | 122 | 123 | 125 | 124 |
| 90 | 123 | 126 | 126 | 129 |
| 120 | 126 | 127 | 130 | 130 |
| 180 | 124 | 124 | 130 | 130 |
| 360 | 120 | 121 | 122 | 124 |

EXAMPLE 38

Curing Study of Epoxy with BZDICY 1073.7 g of DER 331 epoxy resin (diglycidylether hisphenol-A, epoxy equivalent weight 182–192), 550.8 g tetrabromobisphenol-A (TBBPA), and 81.2 g of tetraphenolethane (TPE) (Mn=274, Mw=711) were mixed together until homogeneous. 200.0 g of acetone and 75.5 g of BZDICY were added to the epoxy formulation and mixed until homogeneous. 3.56 g of 2-Methylimidazole (2MI)were then added and the resin mixture was stirred thoroughly until a homogeneous solution was obtained.

The gel time of the epoxy resin was determined at 130°, 150° and 170° C., this data is tabulated below.

| T (°C.) | Gel Time (sec.) |
|---|---|
| 130 | 432 |
| 150 | 221 |
| 170 | 115 |

The resin mixture was impregnated onto 7628 glass fabric at ambient temperature and passed through a drying region at 113° C. The prepreg was then B-Staged at 170° C. for 0, 1, 2, 3, and 5 minutes, Samples E, F, G, H, and I respectively.

Two ply laminates were prepared from the respective B-Staged prepregs and cured in a hydraulic press at 170° C. and 50 psi for varying time periods. The Tg of the cured laminates were determined via DSC and are tabulated below.

|  | Sample | | | | |
|---|---|---|---|---|---|
| Time (mins.) | E Tg (°C.) | F Tg (°C.) | G Tg (°C.) | H Tg (°C.) | I Tg (°C.) |
| 30 | 123 | 121 | 123 | 126.7 | 127 |
| 60 | 122 | 123 | 124 | 131.1 | 126 |
| 90 | 122 | 121 | 122 | 125 | 123 |
| 120 | 124 | 124 | 122 | — | 121 |
| 180 | 125 | 125 | 127 | 129 | 128 |
| 360 | 122 | 119 | 121 | 121 | 120 |

EXAMPLE 39

Curing Study of Epoxy with BZDICY 1073.7 g of DER 331 epoxy resin (diglycidylether bisphenol-A, epoxy equivalent weight 182–192), 550.8 g tetrabromobisphenol-A (TBBPA), and 32.5 g of tetraphenolethane (TPE) (Mn=274, Mw=711) were mixed together until homogeneous. 193.0 g of acetone and 75.5 g of BZDICY were added to the epoxy formulation and mixed until homogeneous. 3.47 g of 2-Methylimidazole (2MI) were then added and the resin mixture was stirred thoroughly until a homogeneous solution was obtained.

The gel time of the epoxy resin was determined at 13020, 150° and 170° C., this data is tabulated below.

| T (°C.) | Gel Time (sec.) |
|---|---|
| 130 | 486 |
| 150 | 249 |
| 170 | 126 |

The resin mixture was impregnated onto 7628 glass fabric at ambient temperature and passed through a drying region at 106° C. The prepreg was then B-Staged at 170° C. for 0, 1, 2, 3, and 5 minutes, Samples J, K, L, M, and N respectively. Two ply laminates were prepared from the respective B-Staged prepregs and cured in a hydraulic press at 170° C. and 50 psi for varying time periods. The Tg of the cured laminates were determined via DSC and are tabulated below.

|  | Sample | | | | |
|---|---|---|---|---|---|
| Time (mins.) | J Tg (°C.) | K Tg (°C.) | L Tg (°C.) | M Tg (°C.) | N Tg (°C.) |
| 30 | 119 | 118 | 118 | 124 | 123 |
| 60 | 123 | 120 | 124 | 127 | 122 |
| 90 | 123 | 122 | 122 | 122 | 121 |
| 120 | 117 | 120 | 122 | 121 | 117 |
| 180 | 121 | 122 | 124 | 121 | 117 |
| 360 | 117 | 119 | 123 | 119 | 117 |

EXAMPLE 40

Curing Study of Epoxy with BZDICY 32.2 g of DER 331 epoxy resin (diglycidylether hisphenol-A, epoxy equivalent weight 182–192), 16.5 g tetrabromobisphenol-A (TBBPA), and 0.974 g of tetraphenolethane (TPE) (Mn=274, Mw=711) were mixed together until homogeneous. 5.7 g of acetone and 1.30 g of BZDICY were added to the epoxy formulation and mixed until homogeneous. 0.102 g of 2-Methylimidazole (2MI) were then added and the resin mixture was stirred thoroughly until a homogeneous solution was obtained.

The gel time of the epoxy resin was determined at 130°, 150° and 170° C., this data is tabulated below.

| T (°C.) | Gel Time (sec.) |
|---|---|
| 130 | 524 |
| 150 | 342 |
| 170 | 140 |

The resin mixture was impregnated onto 7628 glass fabric at ambient temperature and the prepreg was then B-Staged at 170° C. for 2 and 3 minutes, Samples O and P respectively. Two ply laminates were prepared from the respective B-Staged prepregs and cured in a hydraulic press at 170° C. and 50 psi for varying time periods. The Tg of the cured laminates were determined via DSC and are tabulated below.

|  | Sample | |
|---|---|---|
| Time (mins.) | O Tg (°C.) | P Tg (°C.) |
| 30 | 99 | 99 |
| 60 | — | 108 |
| 90 | 109 | 109 |
| 180 | 119 | 118 |
| 360 | 117 | 120 |

EXAMPLE 41

Curing Study of Epoxy with BZDICY 32.2 g of DER 331 epoxy resin (diglycidylether bisphenol-A, epoxy equivalent weight 182–192), 16.5 g tetrabromobisphenol-A (TBBPA), and 2.435 g of tetraphenolethane (TPE) (Mn=274, Mw=711) were mixed together until homogeneous. 5.80 g of acetone and 1.30 g of BZDICY were added to the epoxy formulation and mixed until homogeneous. 0.105 g of 2-Methylimidazole (2MI) were then added and the resin mixture was stirred thoroughly until a homogeneous solution was obtained.

The gel time of the epoxy resin was determined at 130°, 150° and 170° C. This data is tabulated below.

| T (°C.) | Gel Time (sec.) |
|---|---|
| 130 | 497 |
| 150 | 309 |
| 170 | 102 |

The resin mixture was impregnated onto 7628 glass fabric at ambient temperature and the prepreg was then B-Staged at 170° C. for 2 and 3 minutes, Samples Q and R respectively. Two ply laminates were prepared from the respective B-Staged prepregs and cured in a hydraulic press at 170° C. and 50 psi for varying time periods. The Tg of the cured laminates were determined via DSC and are tabulated below.

| | Sample | |
|---|---|---|
| Time (mins.) | Q Tg (°C.) | R Tg (°C.) |
| 30 | 109 | 108 |
| 60 | — | 117 |
| 90 | 114 | 113 |
| 180 | 124 | 125 |
| 360 | 121 | 123 |

EXAMPLE 42

Curing Study of Epoxy with BZDICY 32.2 g of DER 331 epoxy resin (diglycidylether bisphenol-A, epoxy equivalent weight 182–192), 16.5 g tetrabromobisphenol-A (TBBPA), and 2.44 g of tetraphenolethane (TPE) (Mn=274, Mw=711 ) were mixed together until homogeneous. 5.80 g of acetone and 1.30 g of BZDICY were added to the epoxy formulation and mixed until homogeneous. 0.105 g of 2-Methylimidazole (2MI)were then added and the resin mixture was stirred thoroughly until a homogeneous solution was obtained.

The resin mixture was impregnated onto 7628 glass fabric at ambient temperature and the prepreg was then B-Staged at 150° C. for 3 minutes. Two ply laminates were prepared from the B-Staged prepregs and cured in a hydraulic press at 150° C. and 170° C. and 50 psi (Samples S and T respectively) for varying time periods. The Tg of the cured laminates were determined via DSC and are tabulated below.

| | Sample | |
|---|---|---|
| Time (mins.) | S Tg (°C.) | T Tg (°C.) |
| 30 | 107 | 110 |
| 60 | — | 121 |
| 90 | 120 | 122 |
| 180 | 123 | 127 |
| 360 | 132 | 128 |

EXAMPLE 43

Curing Study of Epoxy with BZDICY 31.6 g of DER 331 epoxy resin (diglycidylether bisphenol-A, epoxy equivalent weight 182–192), 16.2 g tetrabromobisphenol-A (TBBPA), and 2.39 g of tetraphenolethane (TPE) (Mn=274, Mw=711) were mixed together until homogeneous. 5.80 g of acetone and 2.20 g of BZDICY were added to the above epoxy formulation and mixed until homogeneous. 0.105 g of 2-Methylimidazole (2MI)were then added and the resin mixture was stirred thoroughly until a homogeneous solution was obtained.

The resin mixture was impregnated onto 7628 glass fabric at ambient temperature and the prepreg was then B-Staged at 150° C. for 3 minutes. Two ply laminates were prepared from the B-Staged prepregs and cured in a hydraulic press at 150° C. and 170° C. and 50 psi (Samples U and V respectively) for varying time periods. The Tg of the cured laminates were determined via DSC and are tabulated below.

| | Sample | |
|---|---|---|
| Time (mins.) | U Tg (°C.) | V Tg (°C.) |
| 30 | 121 | 125 |
| 60 | 127 | 132 |
| 90 | 131 | 131 |
| 180 | 132 | 127 |
| 360 | 134 | 127 |

EXAMPLE 44

Curing Study of Epoxy with BZDICY 32.2 g of DER 331 epoxy resin (diglycidylether bisphenol-A, epoxy equivalent weight 182–192), 16.5 g tetrabromobisphenol-A (TBBPA) and 4.87 g of tetraphenolethane (TPE) (Mn=274, Mw=711) were mixed together until homogeneous. 6.10 g of acetone and 1.30 g of BZDICY were added to the epoxy formulation and mixed until homogeneous. 0. 1097 g of 2-Methylimidazole (2MI)were then added and the resin mixture was stirred thoroughly until a homogeneous solution was obtained.

The resin mixture was impregnated onto 7628 glass fabric at ambient temperature and the prepreg was then B-Staged at 150 and 170° C. for 3, Samples W and X respectively. Two ply laminates were prepared from the respective B-Staged prepregs and cured in a hydraulic press; Sample W at 150° C. and 50 psi and Sample X at 170° C. and 50 psi for varying time periods. The Tg of the cured laminates were determined via DSC and are tabulated below.

| | Sample | |
|---|---|---|
| Time (mins.) | W Tg (°C.) | X Tg (°C.) |
| 30 | 124 | 125 |
| 60 | 131 | 131 |
| 90 | 130 | 131 |
| 180 | 139 | 132 |

EXAMPLE 45

Curing Study of Epoxy with BZDICY 31.6 g of DER 331 epoxy resin (diglycidylether bisphenol-A, epoxy equivalent weight 182–192), and 16.20 g tetrabromobisphenol-A (TBBPA) were mixed together until homogeneous. 5.5 g of acetone and 2.2 g of BZDICY were added to the epoxy formulation and mixed until homogeneous. 0.10 g of 2-phenylimidazole (2PI) were then added and the resin mixture was stirred thoroughly until a homogeneous solution was obtained.

The gel time of the epoxy resin was determined at 150° and 170° C., this data is tabulated below.

| T (°C.) | Gel Time (sec.) |
|---|---|
| 150 | 478 |
| 170 | 263 |

The resin mixture was impregnated onto 7628 glass fabric at ambient temperature and the prepreg was then B-Staged at 170° C. for 3 minutes. Two ply laminates were prepared from the B-Staged prepregs and cured in a hydraulic press at 170° C. and 50 psi for varying time periods. The Tg of the cured laminates were determined via DSC and are tabulated below.

| Time (mins.) | Tg (°C.) |
|---|---|
| 0 (B-Stage) | 57 |
| 30 | 101 |
| 60 | 111 |
| 90 | 109 |
| 120 | 113 |
| 180 | 114 |
| 360 | 116 |

EXAMPLE 46

Curing Study of Epoxy with BZDICY 31.6 g of DER 331 epoxy resin (diglycidylether bisphenol-A, epoxy equivalent weight 182–192), and 16.20 g tetrabromobisphenol-A (TBBPA) were mixed together until homogeneous. 5.5 g of acetone and 2.2 g of BZDICY were added to the epoxy formulation and mixed until homogeneous. 0.281 g of 2-phenylimidazole (2PI) and 0.324 g of isophthalic acid were then added and the resin mixture was stirred thoroughly until a homogeneous solution was obtained.

The gel time of the epoxy resin was determined at 130°, 150° and 170° C. This data is tabulated below.

| T (°C.) | Gel Time (sec.) |
|---|---|
| 130 | 159 |
| 150 | 112 |
| 170 | 89 |

The resin mixture was impregnated onto 7628 glass fabric at ambient temperature and the prepreg was then B-Staged at 170° C. for 3 minutes. Two ply laminates were prepared from the B-Staged prepregs and cured in a hydraulic press at 170° C. and 50 psi for varying time periods. The Tg of the cured laminates were determined via DSC and are tabulated below.

| Time (mins.) | Tg (°C.) |
|---|---|
| 0 (B-Stage) | 79.7 |
| 30 | 123 |
| 60 | 125 |
| 90 | 122 |
| 120 | 121 |
| 180 | 117 |
| 360 | 116 |

EXAMPLE 47

Curing Study of Epoxy with BZDICY 32.2 g of DER 331 epoxy resin (diglycidylether bisphenol-A, epoxy equivalent weight 182–192), 16.50 g tetrabromobisphenol-A (TBBPA), and 2.435 g of tetraphenolethane (TPE) (Mn=274, Mw=711) were mixed together until homogeneous. 5.5 g of acetone and 1.30 g of BZDICY were added to the epoxy formulation and mixed until homogeneous. 0.286 g of 2-phenylimidazole (2PI) and 0.330 g of isophthalic acid were then added and the resin mixture was stirred thoroughly until a homogeneous solution was obtained.

The gel time of the epoxy resin was determined at 130°, 150° and 170° C. This data is tabulated below.

| T (°C.) | Gel Time (sec.) |
|---|---|
| 130 | 121 |
| 150 | 94 |
| 170 | 75 |

The resin mixture was impregnated onto 7628 glass fabric at ambient temperature and the prepreg was then B-Staged at 170° C. for 3 minutes. Two ply laminates were prepared from the B-Staged prepregs and cured in a hydraulic press at 170° C. and 50 psi for varying time periods. The Tg of the cured laminate were determined via DSC and are tabulated below.

| Time (mins.) | Tg (°C.) |
|---|---|
| 0 (B-Stage) | 78.6 |
| 30 | 119 |
| 60 | 122 |
| 90 | 124 |
| 120 | 126 |
| 180 | 126 |

EXAMPLE 48

The sequence of experiments performed to determine if resin advancement occurs during the preparation of solventless formulations are described below.

Sample Y:

50.00 g of DER 331 epoxy resin was degassed in a vacuum oven and the viscosity was measured @ 60° C. using a Brookfield viscometer. The DER 331 resin was also characterized via FTIR spectroscopy, $^{13}$C and $^1$H NMR spectroscopy, and gel permeation chromatography. The viscosity and GPC data are summarized in Table 5.

Sample Z:

A homogeneous mixture of DER 331 and TBBPA was prepared by mixing 50.00 g of DER 331 and 25.70 g of tetrabromobisphenol-A (TBBPA) in a high shear mixer for 20 min. The mixture was degassed in a vacuum oven. The viscosity of the homogeneous mixture was measured @ 60° C. and the mixture was characterized via FTIR, $^{13}$C and $^1$H NMR spectroscopy, and gel permeation chromatography to determine if resin advancement had occurred. The viscosity and GPC data are summarized in Table 5.

Sample AA:

A homogeneous mixture of DER 331 +TBBPA+TBPA was prepared as follows. First 50.00 g of DER 331 and 25.70 g of tetrabromobisphenol-A (TBBPA) were mixed in a high shear mixer for 20 min. until completely homogeneous. Then 0.379 g (0.5 wt %) of TBPA (70% tetrabutyl phosphonium acetate solution in methanol) was added and mixed in the high shear mixer for 5 minutes. The formulation was then degassed in a vacuum oven. The viscosity of the homogeneous formulation was measured @ 60° C. and the formulation was characterized via FTIR, $^{13}$C and $^1$H NMR spectroscopy, and gel permeation chromatography. The viscosity and GPC data are summarized in Table 5.

Sample BB:

A homogeneous mixture of DER 331 +TBBPA+BZDICY was prepared as follows. First 50.00 g of DER 331 and 25.70 g of tetrabromobisphenol-A (TBBPA) were mixed in a high shear mixer for 20 min. until completely homogeneous.

Then 3.51 g (2.015×10⁻³ mols) of BZDICY was added and mixed in the high shear mixer for ca. 10 min. till the BZDICY was completely dissolved. The formulation was then degassed in the vacuum oven. The viscosity was measured @ 60° C. and the formulation was characterized via FTIR, $^{13}$C and $^1$H NMR spectroscopy, and gel permeation chromatography. The viscosity and GPC data are summarized in Table 5.

Sample CC:

A homogeneous mixture of DER 331+TBBPA+ BZDICY+TBPA was prepared as follows. First 50.00 g of DER 331 and 25.70 g of tetrabromobisphenol-A (TBBPA) were mixed in a high shear mixer for 20 min. until completely homogeneous. Then 3.51 g (2.015×10⁻³ mols) of BZDICY and 0.379 g (70% methanol solution) (7.009×10⁻⁴ mols) of tetrabutylphosphonium acetate (TBPA) were added and mixed in the high shear mixer for ca. 10 min. till an homogeneous solution was obtained. The formulation was degassed in the vacuum oven. The viscosity was measured @ 60° C. and the formulation was characterized via FTIR, $^{13}$C and $^1$H NMR spectroscopy, and gel permeation chromatography. The viscosity and GPC data are summarized in Table 5.

Sample DD:

A homogeneous mixture of DER 331+TBBPA+ BZDICY+2MI was prepared as follows. First 50.00 g of DER 331 and 25.70 g of tetrabromobisphenol-A (TBBPA) were mixed in a high shear mixer for 20 min. until completely homogeneous. Then 3.51 g (2.015×10⁻³ mols) of BZDICY and 0.158 g of 2MI were added and mixed in the high shear mixer for ca. 10 min. till an homogeneous solution was obtained. The formulation was degassed in the vacuum oven. The viscosity was measured @ 60° C. and the formulation was characterized via FTIR, $^{13}$C and $^1$H NMR spectroscopy, and gel permeation chromatography. The viscosity and GPC data are summarized in Table 5.

Sample EE:

A homogeneous mixture of DER 331 +TBBPA+ BZDICY+TBPA+2MI was prepared as follows. First 50.00 g of DER 331 and 25.70 g of TBBPA were mixed in a high shear mixer for 20 min. until completely homogeneous. Then 3.51 g (2.015×10⁻³ mols) of BZDICY, 0.379 g of TBPA, and 0.158 g of 2MI were added and mixed in the high shear mixer for ca. 10 min. till an homogeneous solution was obtained. The formulation was degassed in the vacuum oven. The viscosity was measured @ 60° C. and the formulation was characterized via FTIR, $^{13}$C and $^1$H NMR spectroscopy, and gel permeation chromatography. The viscosity and GPC data are summarized in Table 5.

TABLE 5

Summary of viscosity and gel permeation chromatography data.

| Sample | Composition | Viscosity @ 60° C. (cp) | Mn | Mw | Mz |
| --- | --- | --- | --- | --- | --- |
| Y | DER 331 | 302 | 150 | 200 | 350 |
| Z | DER 331 + TBBPA | 1650 | 170 | 220 | 340 |
| AA | DER 331 + TBBPA + TBPA | 2050 | 190 | 300 | 530 |
| BB | DER 331 + TBBPA + BZDICY | 2760 | 180 | 250 | 430 |
| CC | DER 331 + TBBPA + TBPA + BZDICY | 3670 | 180 | 280 | 500 |
| DD | DER 331 + TBBPA + BZDICY + 2MI | 3120 | 180 | 260 | 460 |

TABLE 5-continued

Summary of viscosity and gel permeation chromatography data.

| Sample | Composition | Viscosity @ 60° C. (cp) | Mn | Mw | Mz |
| --- | --- | --- | --- | --- | --- |
| EE | DER 331 + TBBPA + TBPA + BZDICY + 2MI | 5910 | 190 | 300 | 550 |

EXAMPLE 49

Part A: 2.20 grams (1.263×10⁻² moles) of BZDICY, 0.048 grams (1.344×10⁻⁴ moles) of methyltriphenylphosphonium bromide, and 0.10 grams (1.218×10⁻³ moles) of 2-Methylimidazole were dissolved in 5.60 grams of acetone.

Part B: 31.60 g of diglycidylether-bisphenol-A resin (DGEBA) (DER 331, epoxy equivalent weight 187) and 16.20 grams of tetrabromobisphenol-A (TBBPA) were mixed together with a high shear mixer until a homogeneous mixture was obtained.

Part A and Part B were mixed until a homogeneous solution was obtained and then allowed to age for 30 minutes. The resin varnish was coated onto 7628 glass fabric and B-Staged for 3 minutes at 170° C. Two plys of the B-Staged prepregs were laminated and cured in a hydraulic press at 170° C. and 50 psi for varying periods of time. The Tg of the cured laminate was determined via DSC and are tabulated below.

| Time (mins.) | Tg (°C.) |
| --- | --- |
| 30 | 118 |
| 60 | 121 |
| 90 | 124 |
| 120 | 126 |
| 180 | 122 |

EXAMPLE 50

Part A: 3.51 grams (2.015×10⁻² moles) of BZDICY, 0.189 grams (70% methanol solution) (3.495×10⁻⁴ moles) of tetrabutylphosphonium acetate, and 0.151 grams (1.839×10⁻³ moles) of 2-Methylimidazole were mixed together.

Part B: 50.00 g of diglycidylether-bisphenol-A resin (DGEBA) (DER 331. epoxy equivalent weight 187) and 25.70 grams of tetrabromobisphenol-A (TBBPA) were mixed together with a high shear mixer until a homogeneous mixture was obtained.

Part A and Part B were mixed until a homogeneous solution was obtained and allowed to age for 30 minutes. The resin varnish was coated onto 7628 glass fabric and B-Staged for 3 minutes at 170° C. Two plies of the B-Staged prepregs were laminated and cured in a hydraulic press at 170° C. and 50 psi for varying periods of time. The Tg of the cured laminate was determined via DSC and are tabulated below.

| Time (mins.) | Tg (°C.) |
| --- | --- |
| 0 (B-Stage) | 40.5 |
| 30 | 107 |
| 60 | 109 |
| 90 | 114 |

| Time (mins.) | Tg (°C.) |
|---|---|
| 120 | 116 |
| 150 | 117 |
| 180 | 118 |

EXAMPLE 51

Part A: 3.51 grams ($2.015 \times 10^{-2}$ moles) of BZDICY, 0.189 grams (70% methanol solution) ($3.495 \times 10^{-4}$ moles) of tetrabutylphosphonium acetate, and 0.151 grams ($1.839 \times 10^{-3}$ moles) of 2-Methylimidazole were dissolved in 8.41 grams acetone.

Part B: 50.00 g of diglycidylether-bisphenol-A resin (DGEBA) (DER 331, epoxy equivalent weight 187) and 25.70 grams of tetrabromobisphenol-A (TBBPA) were mixed together with a high shear mixer until a homogeneous mixture was obtained.

Part A and Part B were mixed until a homogeneous solution was obtained and then allowed to age for 30 minutes. The gel time of the resin varnish was determined at 130°, 150° and 170° C. This data is tabulated below:

| T (°C.) | Gel Time (sec.) |
|---|---|
| 130 | 310 |
| 150 | 200 |
| 170 | 109 |

The resin varnish was coated onto 7628 glass fabric and B-Staged for 3 minutes at 150° C. and 170° C. (Samples 51A and 51 B, respectively). Two plies of the respective B-Staged prepregs were laminated and cured in a hydraulic press; Sample 51A at 150° C. and 50 psi and Sample 51B at 170° C. and 50 psi for varying periods of time. The Tg of the cured laminates were determined via DSC and are tabulated below.

| | Sample | |
|---|---|---|
| Time (mins.) | 51A Tg (°C.) | 51B Tg (°C.) |
| 0 (B-Stage) | 49.4 | 88 |
| 30 | 113 | 125 |
| 60 | 119 | 127 |
| 90 | 125 | 127 |
| 120 | 126 | 128 |
| 150 | 129 | 127 |
| 180 | 129 | 125 |

EXAMPLE 52

Part A: 3.51 grams ($2.015 \times 10^{-2}$ moles) of BZDICY, 0.379 grams (70% methanol solution) ($7.009 \times 10^{-4}$ moles) of tetrabutylphosphonium acetate, and 0.151 grams ($1.839 \times 10^{-3}$ moles) of 2-Methylimidazole were dissolved in 8.41 grams of acetone.

Part B: 50.00 g of diglycidylether-bisphenol-A resin (DGEBA) (DER 331, epoxy equivalent weight 187) and 25.70 grams of tetrabromobisphenol-A (TBBPA) were mixed together with a high shear mixer until a homogeneous mixture was obtained.

Part A and Part B were mixed until a homogeneous solution was obtained and then allowed to age for 30 minutes. The gel time of the resin varnish was determined at 130°, 150° and 170° C. This data is tabulated below:

| T (°C.) | Gel Time (sec.) |
|---|---|
| 130 | 319 |
| 150 | 206 |
| 170 | 115 |

The resin varnish is coated onto 7628 glass fabric and B-Staged for 3 minutes at 150° C. and 170° C. (Samples 52A and 52B, respectively). Two plies of the respective B-Staged prepregs were laminated and cured in a hydraulic press; Sample 52A at 150° C. and 50 psi and Sample 52B at 170° C. and 50 psi for varying periods of time. The Tg of the cured laminates were determined via DSC and are tabulated below.

| | Sample | |
|---|---|---|
| Time (mins.) | 52A Tg (°C.) | 52B Tg (°C.) |
| 0 (B-Stage) | 79.9 | 79.9 |
| 30 | 120 | 124 |
| 60 | 123 | 128 |
| 90 | 127 | 128 |
| 120 | 129 | 127 |
| 150 | 130 | 125 |
| 180 | 133 | 123 |

EXAMPLE 53

Part A: 3.51 grams ($2.015 \times 10^{-2}$ moles) of BZDICY, 0.156 grams ($5.948 \times 10^{-4}$ moles) of triphenylphosphine, and 0.151 grams ($1.839 \times 10^{-3}$ moles) of 2-Methylimidazole were dissolved in 8.41 grams of acetone.

Part B: 50.00 g of diglycidylether-bisphenol-A resin (DGEBA) (DER 331, epoxy equivalent weight 187) and 25.70 grams of tetrabromobisphenol-A (TBBPA) were mixed together with a high shear mixer until a homogeneous mixture was obtained.

Part A and Part B were mixed until a homogeneous solution was obtained and then allowed to age for 30 minutes. The gel time of the resin varnish was determined at 130°, 150° and 170° C. This data is tabulated below:

| T (°C.) | Gel Time (sec.) |
|---|---|
| 130 | 288 |
| 150 | 196 |
| 170 | 119 |

The resin varnish was coated onto 7628 glass fabric and B-Staged for 3 minutes at 150° C. and 170° C. (Samples 53A and 53B, respectively). Two plies of the respective B-Staged prepregs were laminated and cured in a hydraulic press; Sample 53A at 150° C. and 50 psi and Sample 53B at 170° C. and 50 psi for varying periods of time. The Tg of the cured laminates were determined via DSC and are tabulated below.

| | Sample | |
|---|---|---|
| Time (mins.) | 53A Tg (°C.) | 53B Tg (°C.) |
| 0 (B-Stage) | 45 | 76.8 |

-continued

| | Sample | |
|---|---|---|
| Time (mins.) | 53A Tg (°C.) | 53B Tg (°C.) |
| 30 | 113 | 121 |
| 60 | 118 | 125 |
| 90 | 122 | 127 |
| 120 | 123 | 126 |
| 150 | 124 | 125 |
| 180 | 127 | 122 |

EXAMPLE 54

Part A: 3.51 grams ($2.015 \times 10^{-2}$ moles) of BZDICY, 0.312 grams ($1.190 \times 10^{-3}$ moles) of triphenylphosphine, and 0.151 grams ($1.839 \times 10^{-3}$ moles) of 2-Methylimidazole were dissolved in 8.41 grams of acetone.

Part B: 50.00 g of diglycidylether-bisphenol-A resin (DGEBA) (DER 331, epoxy equivalent weight 187) and 25.70 grams of tetrabromobisphenol-A (TBBPA) were mixed together with a high shear mixer until a homogeneous mixture was obtained.

Part A and Part B were mixed until a homogeneous solution was obtained and then allowed to age for 30 minutes. The gel time of the resin varnish was determined at 130°, 150° and 170° C. This data is tabulated below:

| T (°C.) | Gel Time (sec.) |
|---|---|
| 130 | 295 |
| 150 | 199 |
| 170 | 115 |

The resin varnish was coated onto 7628 glass fabric and B-Staged for 3 minutes at 150° C. and 170° C. (Samples 54A and 54B, respectively). Two plies of the respective B-Staged prepregs were laminated and cured in a hydraulic press; Sample 54A at 150° C. and 50 psi and Sample 54B at 170° C. and 50 psi for varying periods of time. The Tg of the cured laminates were determined via DSC and are tabulated below.

| | Sample | |
|---|---|---|
| Time (mins.) | 54A Tg (°C.) | 54B Tg (°C.) |
| 0 (B-Stage) | 51 | 87 |
| 30 | 110 | 120 |
| 60 | 117 | 123 |
| 90 | 123 | 127 |
| 120 | 125 | 127 |
| 150 | 126 | 126 |
| 180 | 127 | 123 |

EXAMPLE 55

17 pounds of BZDICY and 0.767 pounds of 2-Methylimidazole were dissolved in 45 pounds of acetone. To this solution was added 242 pounds of diglycidylether-bisphenol-A resin (DGEBA) (DER 331, epoxy equivalent weight 187) and 124 pounds of tetrabromobisphenol-A (TBBPA) with stirring to yield a homogeneous solution. The epoxy resin varnish was aged at ambient temperature for 4.50 hours and found to have a viscosity of 700 cP. The gel time of the resin varnish was determined at 170° C. to be 270 seconds. The resin varnish was aged 17 hours at ambient temperature and an additional 30 pounds of acetone was added to the epoxy resin varnish with stirring and the viscosity was determined to be 140 cP. The gel time of the resin varnish was determined at 170° C. to be 240 seconds.

The resin varnish was impregnated onto 1080 and 7628 glass fabric and B-Staged at 150° C. to 180° C. with a residence time of 3 to 4 minutes at temperature. The 1080 prepregs (Sample FF) had a resin content of 58%. The 7628 prepregs had a resin content of 41% (Sample GG) and 45% (Sample HH).

| Shelf-Life of Prepregs | | |
|---|---|---|
| | Sample | |
| | GG | HH |
| Days | Resin Flow (%) | |
| 1 | 20.4 | 24.1 |
| 12 | — | 23.7 |
| 14 | 20.3 | — |
| 35 | — | 26.2 |
| 37 | 20.6 | — |

Sample II:

Two plies of 1080 glass fabric prepregs (Sample FF) containing 58 wt % of the resin were sandwiched between two sheets of 1 oz. copper. The prepreg lay-up was 36"×48". The lay-up was placed between two press plates and inserted in a production press that was pre-heated to 310° F. A pressure of 50 psi was applied for the first 8 mins. after which the pressure was increased to 900 psi. After 20 mins. at 310° F. the temperature was increased to 350° F. and held for 35 min. The laminates were then cooled to room temperature under pressure and cut into 18"×24" panels. The laminate properties are tabulated in Table 6.

Sample JJ:

Two plies of 7628 glass fabric prepregs containing 41 wt % of the resin (Sample GG) were sandwiched between two sheets of 1 oz. copper. The prepreg lay-up was 36"×48". The lay-up was placed between two press plates and inserted in a production press that was pre-heated to 310° F. A pressure of 50 psi was applied for the first 8 mins. after which the pressure was increased to 900 psi. After 20 mins. at 310° F. the temperature was increased to 350° F. and held for 35 min. The laminates were then cooled to room temperature under pressure and cut into 18"×24" panels. The laminate properties are tabulated in Table 6.

Sample KK: 0.060" laminates were prepared using 8 plies of 7628 glass fabric prepregs. The outer two prepreg sheets consisted of 45 wt % resin (Sample HH), whereas the inner six sheets contained 41 wt % resin (Sample GG). The eight plies were sandwiched between two sheets of 1 oz. copper. The prepreg lay-up was 36"×48". The lay-up was placed between two press plates and inserted in a production press that was pre-heated to 310° F. A pressure of 50 psi was applied for the first 8 mins. after which the pressure was increased to 900 psi. After 20 mins. at 310° F. the temperature was increased to 350° F. and held for 35 min. The laminates were then cooled to room temperature under pressure and cut into 18"×24" panels. The laminate properties are tabulated in Table 6.

TABLE 6

| Property | Sample II | Sample JJ | Sample KK |
|---|---|---|---|
| Tg (no post Bake) (°C.) | 122 | 122 | 124 |
| Solder Float[a] (550° F.) Avg. (secs) | 125 | 14 | 195 |
| Water Absorption[b] (%) D 24/23 | 1.98 | 0.96 | 0.26 |
| Dielectric Constant[c] D 24/23 | 4.45 | 4.87 | 4.73 |
| Dissipation Factor[d] D 24/23 | 0.031 | 0.025 | 0.020 |
| Peels A (lbs/in)[e] | 10.3 | 10.8 | 11.1 |
| Peels TS (lbs/in)[f] | 10.2 | 10.8 | 10.9 |
| Peels ATE (lbs/in)[g] | 5.8 | 5.9 | 6.1 |
| Peels Process (lbs/in)[h] | 9.3 | 9.3 | 8.6 |
| Electric Strength (V/mil) | 1492 | 1123 | 685 |
| Methylene Chloride Absorption (%) | 15.4 | 5.5 | 1.9 |
| Flammability[i] | V0 | V0 | V1 |
| Pressure Cooker[j] 30 minute | 5 | 2 | 5 |

[a] Solder Float: Strips of laminate floated on solder @ 550° F. and time recorded to observe blisters.
[b] Water Absorption after 24 hour soak in distilled water 23° C.
[c] Dielectric Constant at 1 MHz, after 24 hour soak in distilled water 23° C. MIL Spec 13949 (IPC Reference is IPC TM650).
[d] Dissipation Factor at 1 MHz, after 24 hour soak in distilled water 23° C. MIL Spec 13949 (IPC Reference is IPC TM650).
[e] Peels A: Specified in IPC TM650 — ⅛" wide laminate strip tested as received, pulled @ 90° angle. MIL Spec 13949 (IPC Reference is IPC TM650).
[f] Peels TS: Thermal stress (solder @ 550° F. for 10 secs.) prior to peels test. MIL Spec 13949 (IPC Reference is IPC TM650).
[g] Peels ATE: Peels Test conducted @ 125° C. in oil bath. MIL Spec 13949 (IPC Reference is IPC TM650).
[h] Peels Process: Laminate soaked sequentially in heated sodium hydroxide solution; boric acid solution; methylene chloride; 101 trichloro; and peanut oil before Peels test. MIL Spec 13949 (IPC Reference is IPC TM650).
[i] Flammability: UL 94.
[j] Pressure cooker: Laminate held @ 15 psi in pressure cooker for 30 mins. Visually observed for flaws, a relative index is used, 5 is good and 0 is bad. MIL Spec 13949 (IPC Reference is IPC TM650).

EXAMPLE 56

17 pounds of BZDICY and 0.767 pounds of 2-Methylimidazole were dissolved in 45 pounds of acetone. To this solution was added 242 pounds of diglycidylether-bisphenol-A resin (DGEBA) (DER 331, epoxy equivalent weight 187), 124 pounds of tetrabromobisphenol-A (TBBPA) and 18.3 pounds of tetraphenolethane were added with stirring to yield a homogeneous solution. The epoxy resin varnish was aged at ambient temperature for 3.50 hours and found to have a viscosity of 1840 cP. The gel time of the resin varnish was determined at 170° C. to be 182 seconds. An additional 10 pounds of acetone was added to the epoxy resin varnish with stirring and the viscosity was determined to be 840 cP. The resin varnish was aged 17 hours at ambient temperature and the viscosity was determined to be 1060 cP. The gel time of the resin varnish was determined at 170° C. to be 200 seconds.

The resin varnish was impregnated onto 7628 glass fabric and B-Staged at 150° C. and 180° C. with a residence time of 3 to 4 minutes at temperature (Sample LL).

Shelf-Life of Prepregs

| Days | Sample LL Resin Flow (%) |
|---|---|
| 1 | 18.6 |
| 11 | 19.1 |
| 34 | 21.9 |

Sample MM:
Two plies of 7628 glass fabric prepregs (Sample LL) were sandwiched between two sheets of 1 oz. copper. The prepreg lay-up was 36"×48". The lay-up was placed between two press plates and inserted in a production press that was pre-heated to 310° F. A pressure of 50 psi was applied for the first 8 mins. after which the pressure was increased to 900 psi. After 20 mins. at 310° F. the temperature was increased to 350° F. and held for 35 min. The laminates were then cooled to room temperature under pressure and cut into 18"×24" panels. The laminate properties are tabulated in Table 7.

Sample NN: 0.060" laminates were prepared using 8 plies of 7628 glass fabric prepregs (Sample LL). The eight plies were sandwiched between two sheets of 1 oz. copper. The prepreg lay-up was 36"×48". The lay-up was placed between two press plates and inserted in a production press that was pre-heated to 310° F. A pressure of 50 psi was applied for the first 8 mins. after which the pressure was increased to 900 psi. After 20 mins. at 310° F. the temperature was increased to 350° F. and held for 35 min. The laminates were then cooled to room temperature under pressure and cut into 18"×24" panels. The laminate properties are tabulated in Table 7.

TABLE 7

| Property | Sample MM | Sample NN |
|---|---|---|
| Tg (no post Bake) (°C.) | 122 | 125 |
| Solder Float (550° F.) Avg. (secs) | 139 | 199 |
| Water Absorption (%) D 24/23 | 0.91 | 0.24 |
| Dielectric Constant D 24/23 | 5.01 | 4.81 |
| Dissipation Factor D 24/23 | 0.024 | 0.020 |
| Peels A (lbs/in) | 11.0 | 11.0 |
| Peels TS (lbs/in) | 10.7 | 10.8 |
| Peels ATE (lbs/in) | 6.0 | 6.0 |
| Peels Process (lbs/in) | 9.0 | 8.0 |
| Electric Strength (V/mil) | 1076 | 685 |
| Methylene Chloride Absorption (%) | 4.8 | 1.6 |
| Flammability | V0 | V1 |
| Pressure Cooker 30 minute | 1 | 5 |

EXAMPLE 57

4.65 grams ($2.670 \times 10^{-2}$ moles) of BZDICY, 0.21 grams ($2.558 \times 10^{-3}$ moles) of 2-Methylimidazole, 60.09 g of diglycidylether-bisphenol-A resin (DGEBA) (DER 331, epoxy equivalent weight 187) and 33.90 grams of tetrabromobisphenol-A (TBBPA) were mixed together with a high shear mixer until a homogeneous mixture was obtained. To this base formulation was added varying levels of acetone to prepare a resin varnish containing 10.0 wt. %, 12.5 wt. %, 15.0 wt. %, 20.0 wt. %, and 25 wt. % acetone. The viscosity of the resin varnish was then determined at 26° C. and is tabulated below.

| Wt. % Acetone | Viscosity (cP) @ 26° C. |
|---|---|
| 10.0 | 940 |
| 12.5 | 835 |
| 15.0 | 225 |
| 20.0 | 80 |
| 25.0 | 30 |

EXAMPLE 58

Figure 2:
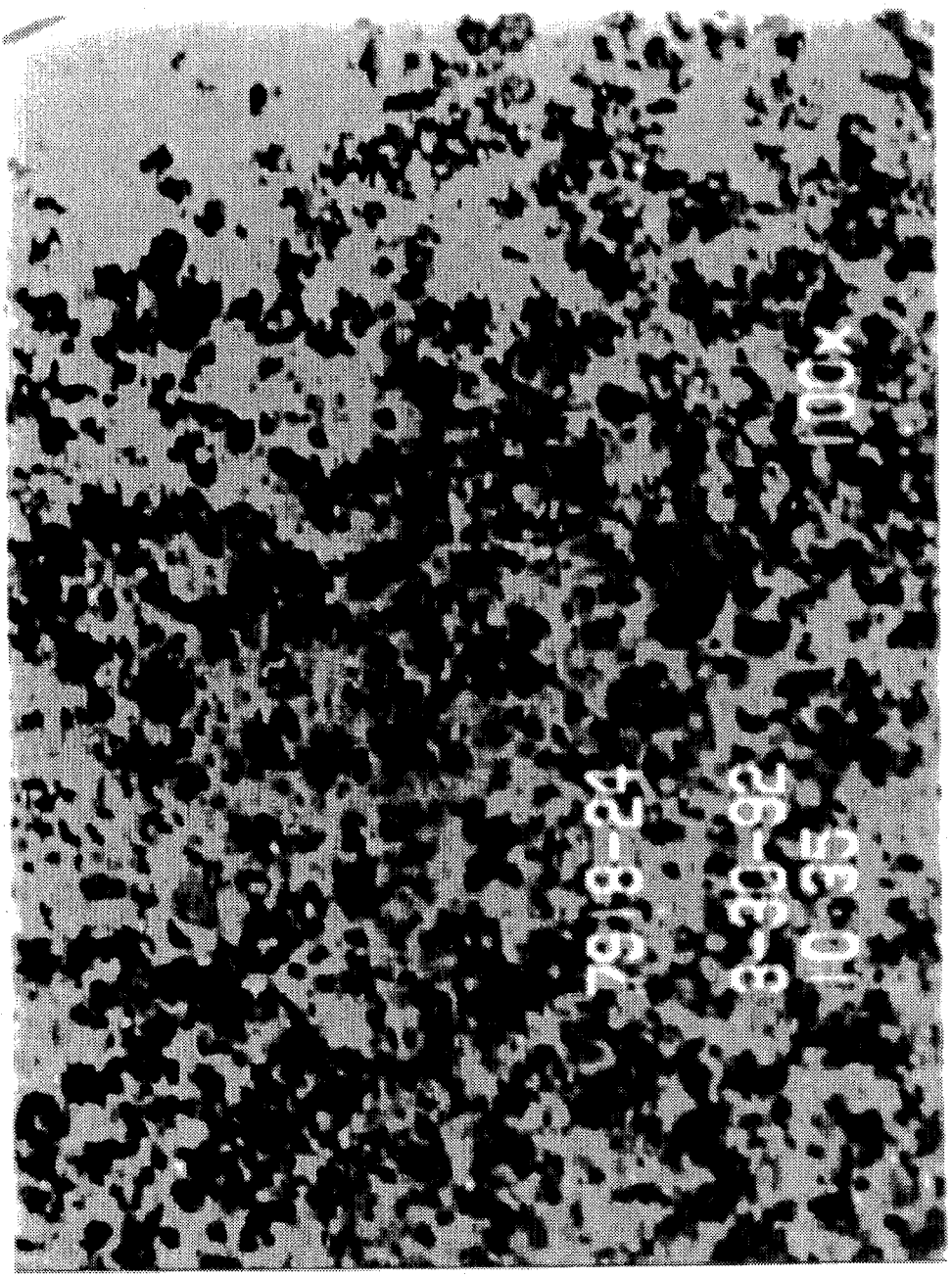
FIG. 2 is a photograph of the mixture of FIG. 1 after 3 days.

Examination of DICY in DGEBA Resin 0.1569 g of DICY was mixed with 4.08 g of diglycidyl ether-bisphenol-A resin (DGEBA) (DER 331) at 125° C. The resin was placed on a glass slide and examined via optical microscopy at room temperature. The resin shows undissolved material under non-polarized or polarized light after immediate preparation and after 3 days, FIGS. 1 and 2 respectively.

EXAMPLE 59

Figure 3:
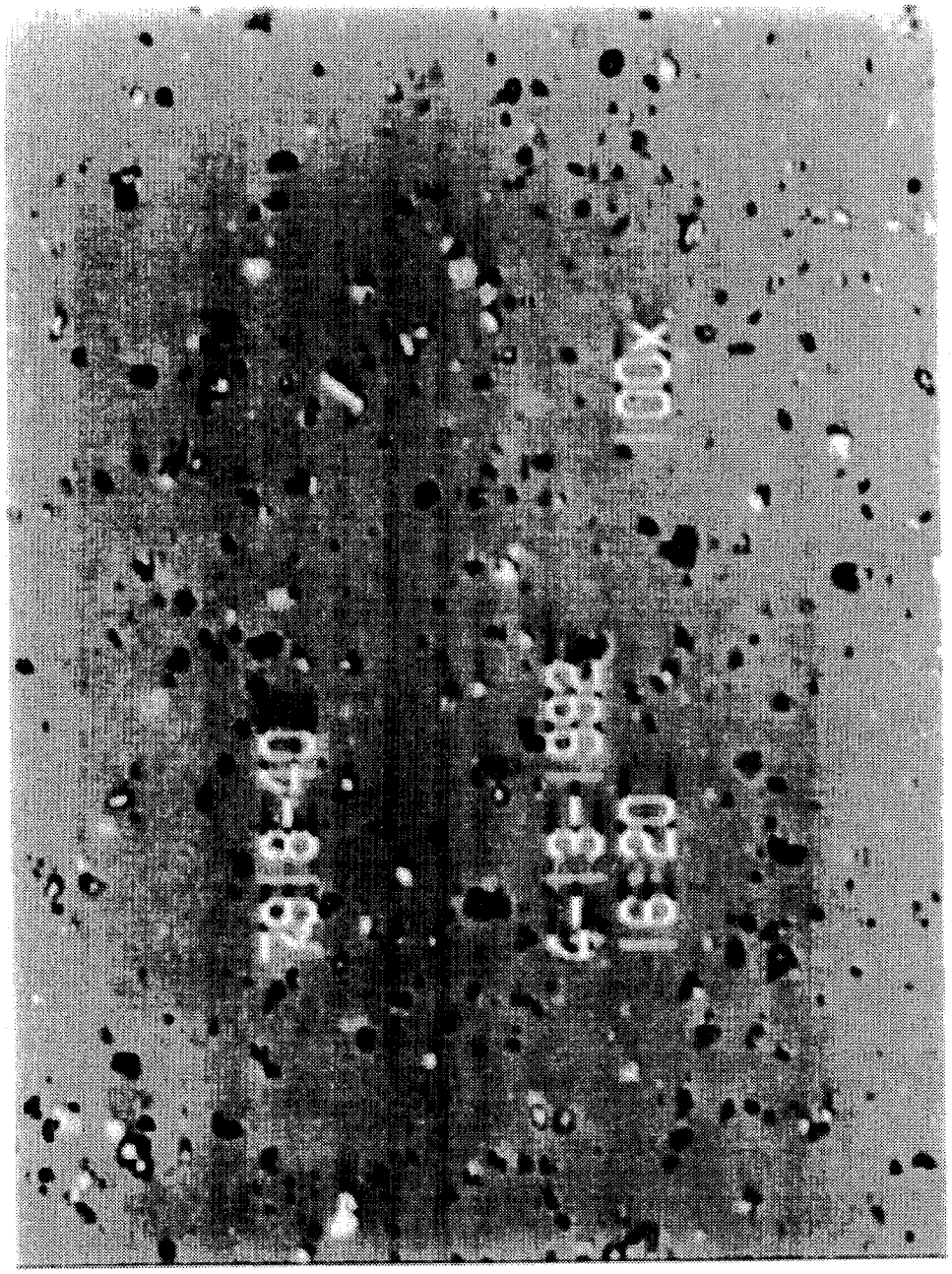
FIG. 3 is a photograph of a mixture of DICY with a diglycidyl ether-bisphenol A-epoxy resin.
Figure 4:
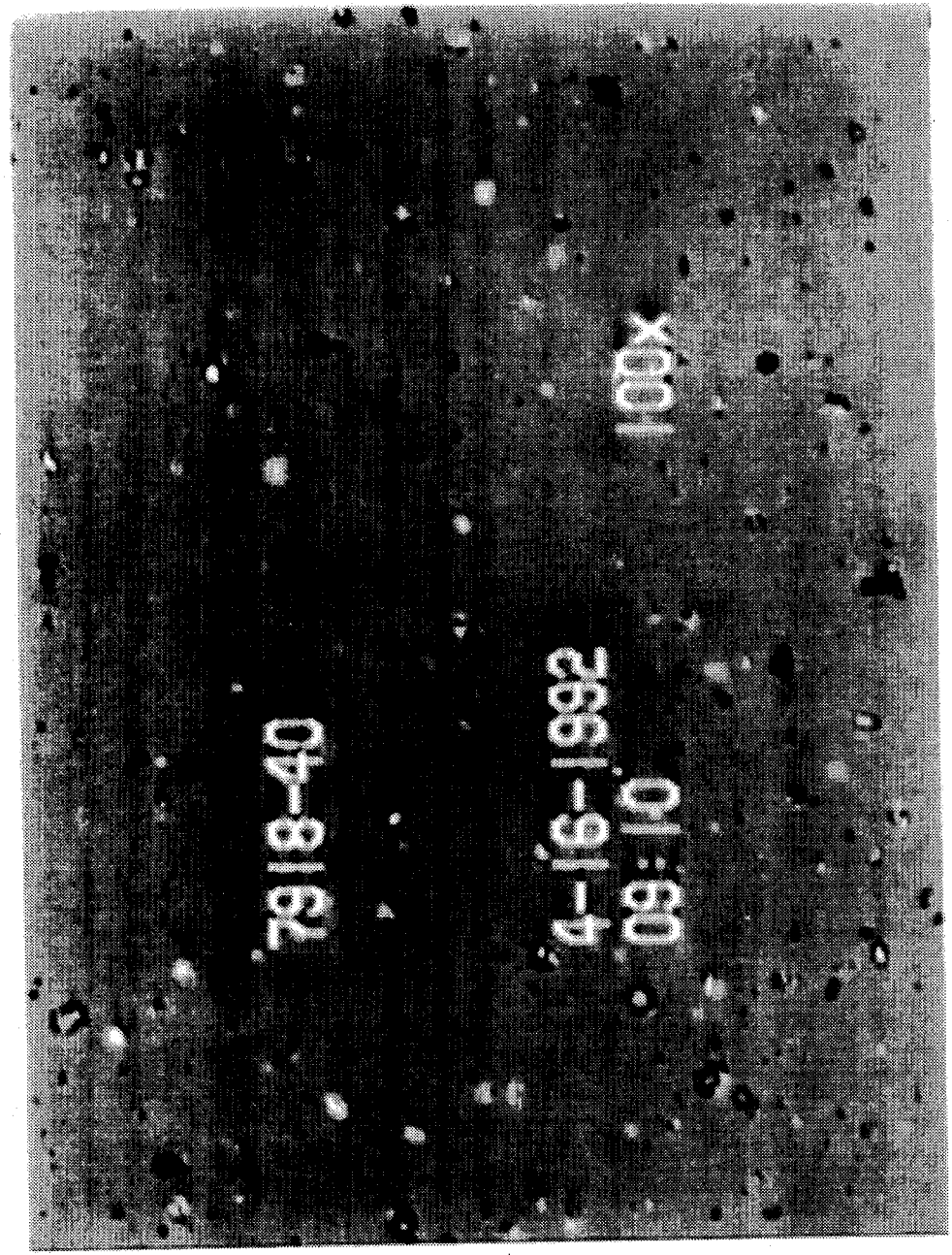
FIG. 4 is a photograph of the mixture of FIG. 3 after 3 days.

Examination of DICY in DGEBA Resin 0.28 g of DICY was mixed with 49.93 g of diglycidyl ether-bisphenol-A resin (DGEBA) (DER 331) at 120° C. The resin was placed on a glass slide and examined via optical microscopy at room temperature. The resin shows undissolved material under non-polarized or polarized light after immediate preparation and after 3 days, FIGS. 3 and 4 respectively.

EXAMPLE 60

Figure 5:
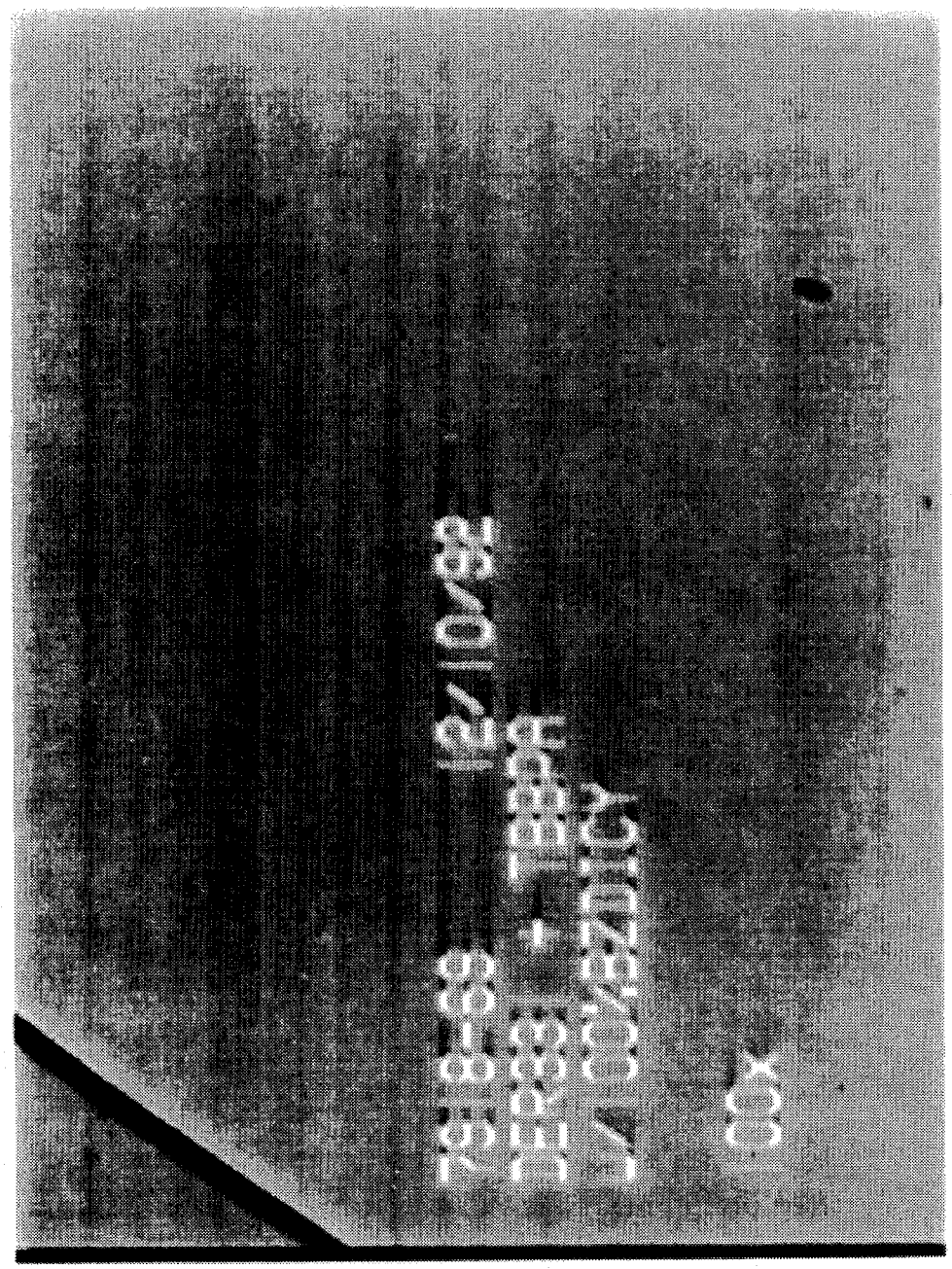
FIG. 5 is a photograph of a mixture of BZDICY with a diglycidyl ether-bisphenol A-epoxy resin, tetrabromobisphenol A, and 2-methylimidazole after 5.5 months.

Examination of BZDICY in DGEBA/TBBPA Resin 2.20 g of BZDICY was mixed with 31.60 g of diglycidyl ether-bisphenol-A resin (DGEBA) (DER 331 ) and 16.20 g of tetrabromobisphenol-A (TBBPA) at 120° C. 0.1034 g of 2-Methylimidazole was then added. The resin was placed on a glass slide and examined via optical microscopy at room temperature. The resin is homogeneous after 5.5 months, FIG. 5.

We claim:

1. A solvent-free, homogeneous and liquid curable composition for preparation of epoxy resin laminates consisting essentially of
    (a) a liquid epoxy resin;
    (b) as a curing agent a substituted dicyandiamide dissolved in said liquid epoxy of (a) having the formula

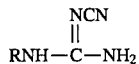

where
    R is $CH_2C_6H_4X$, or $-CH_2CH_2C_6H_4X$
and
    X is $-H$, $-CH_3$, or $OCH_3$
    (c) a chain extender selected from the group consisting of biphenols, bisphenols, trisphenols, tetraphenols, multifunctional phenols, dicarboxylic acids, tricarboxylic acids, tetracarboxylic acids, phenol carboxylic acids and mixtures thereof;
    (d) optionally, a stabilizer comprising organic or inorganic acids; and
    (e) a catalyst selected from the group consisting of nitrogen containing and phosphorous containing catalysts and mixtures thereof.

2. A composition of claim 1 wherein said curing agent of (b) is N-benzyl-dicyandiamide.

3. A composition of claim 1 wherein said curing agent of (b) is N-(4-methyl benzyl)-dicyandiamide.

4. A composition of claim 1 wherein said curing agent of (b) is N-(4-methoxy benzyl)-dicyandiamide.

5. A composition of claim 1 wherein said curing agent of (b) is 1-phenethyl-3-cyanoguanidine.

6. A composition of claim 1 wherein said epoxy resin is a diglycidyl ether of bisphenol-A.

7. A composition of claim 1 wherein said chain extender is bisphenol-A, tetrabromo bisphenol-A, or mixtures thereof.

8. A composition of claim 1 wherein said chain extender is tetraphenol ethane, tetraphenol methane, or mixtures thereof with tetrabromo bisphenol A.

9. A composition of claim 1 wherein said catalyst is 1-isopropyl- 2-methyl imidazole salicylate, 2-methyl imidazole, or 2-phenyl imidazole.

10. A composition of claim 1 wherein said catalyst is tetrabutyl phosphonium acetate.

11. A composition of claim 1 wherein said catalyst is methyl triphenyl phosphonium bromide.

12. A composition of claim 1 wherein said catalyst is triphenyl phosphine.

13. A composition of claim 1 wherein said stabilizer is isophthalic acid.

* * * * *